(12) United States Patent
Palanigounder et al.

(10) Patent No.: US 8,886,164 B2
(45) Date of Patent: Nov. 11, 2014

(54) METHOD AND APPARATUS TO PERFORM SECURE REGISTRATION OF FEMTO ACCESS POINTS

(75) Inventors: Anand Palanigounder, San Diego, CA (US); Arungundram C. Mahendran, San Diego, CA (US); Lakshminath R. Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/625,047

(22) Filed: Nov. 24, 2009

(65) Prior Publication Data

US 2010/0130171 A1 May 27, 2010

Related U.S. Application Data

(60) Provisional application No. 61/118,397, filed on Nov. 26, 2008.

(51) Int. Cl.
*H04M 1/68* (2006.01)
*H04W 12/06* (2009.01)
*H04W 84/04* (2009.01)
*H04L 29/06* (2006.01)

(52) U.S. Cl.
CPC ............ *H04W 12/06* (2013.01); *H04W 84/045* (2013.01); *H04L 65/1073* (2013.01); *H04L 63/0823* (2013.01)
USPC ........ 455/411; 455/435.1; 455/444; 370/312; 370/338

(58) Field of Classification Search
USPC ................... 455/410–411, 435.1, 432.1–444; 370/230, 310–312, 328, 338
See application file for complete search history.

(56) References Cited

U.S. PATENT DOCUMENTS 7,215,667 B1* 5/2007 Davis ............................ 370/389
7,768,983 B2* 8/2010 Nylander et al. ............. 370/338
(Continued)

FOREIGN PATENT DOCUMENTS

EP 1775976 4/2007
JP 2006174152 A 6/2006
(Continued)

OTHER PUBLICATIONS

International Search Report and Written Opinion—PCT/US2009/065972, International Search Authority—European Patent Office—Sep. 3, 2010.

(Continued)

*Primary Examiner* — Sharad Rampuria

(57) ABSTRACT

Methods, apparatus, and systems to perform secure registration of a femto access point for trusted access to an operator-controlled network element. Method steps include establishing a security association for at least one said femto access point, making a request using the security association to an operator-controlled network element, which requests a secure registration credential from an authorizing component. The operator-controlled network element constructs a secure registration credential and sends the secure registration credential to the requesting femto access point, thus authorizing trusted access by the requesting femto access point to access operator-controlled network elements. Embodiments include establishing a security association via an IPsec security association received from a security gateway which is within an operator-controlled domain and using an operator-controlled database of IPsec inner addresses. In some embodiments the femto access point conducts message exchanges using one or more IMS protocols and components, including call session control function elements, which elements in turn may authorize a femto access point within the IMS domain, may or access non-IMS network elements for authorization.

55 Claims, 14 Drawing Sheets

(56) References Cited

U.S. PATENT DOCUMENTS

| | | | |
|---|---|---|---|
| 8,305,960 B2 * | 11/2012 | Vikberg et al. | 370/328 |
| 8,311,561 B2 * | 11/2012 | Wang et al. | 455/456.6 |
| 8,504,032 B2 * | 8/2013 | Lott et al. | 455/435.1 |
| 8,538,382 B2 * | 9/2013 | Shu et al. | 455/411 |
| 8,665,768 B2 * | 3/2014 | Tinnakornsrisuphap et al. | 370/312 |
| 8,705,503 B2 * | 4/2014 | Yang et al. | 370/338 |
| 8,750,829 B2 * | 6/2014 | Drevon et al. | 455/411 |
| 2003/0119519 A1 * | 6/2003 | Madour et al. | 455/453 |
| 2005/0009533 A1 * | 1/2005 | Benveniste et al. | 455/452.2 |
| 2006/0171541 A1 | 8/2006 | Horn et al. | |
| 2006/0280305 A1 * | 12/2006 | Bajko et al. | 380/270 |
| 2008/0076425 A1 * | 3/2008 | Khetawat et al. | 455/436 |
| 2008/0084879 A1 * | 4/2008 | Mirza-Baig | 370/392 |
| 2008/0244148 A1 | 10/2008 | Nix, Jr. et al. | |
| 2009/0067417 A1 * | 3/2009 | Kalavade et al. | 370/356 |
| 2009/0296676 A1 * | 12/2009 | O'Neil et al. | 370/338 |
| 2013/0095792 A1 * | 4/2013 | Putman et al. | 455/411 |

FOREIGN PATENT DOCUMENTS

| | | |
|---|---|---|
| JP | 2006518121 A | 8/2006 |
| JP | 2007151090 A | 6/2007 |
| JP | 2008219150 A | 9/2008 |
| JP | 2009504051 A | 1/2009 |
| JP | 2009505576 A | 2/2009 |
| JP | 2010525643 A | 7/2010 |
| WO | 2004075584 A1 | 9/2004 |
| WO | WO2007015075 A1 | 2/2007 |
| WO | WO2007024455 A1 | 3/2007 |
| WO | WO2008125657 A1 | 10/2008 |

OTHER PUBLICATIONS

Tatara Systems: "SIP Based Architecture for Integration of IxRTT Femtocells" Internet Citation Oct. 13, 2007, pp. 1-26, XP002539795 Retrieved from the Internet: URL:ftp://ftp.3gpp2.org/TSGS/Working/_2007 /2007-10-Fenito_Cel l_Workshop-Bo.

* cited by examiner

METHOD AND APPARATUS TO PERFORM SECURE REGISTRATION OF FEMTO ACCESS POINTS

CLAIM OF PRIORITY UNDER 35 U.S.C. 119

The present invention for patent claims priority to U.S. Provisional Application 61/118,397 filed Nov. 26, 2008 assigned to the assignee hereof and hereby expressly incorporated by reference herein.

BACKGROUND

I. Field

The following disclosure relates generally to wireless communication and, more specifically, to secure registration of femto access points.

II. Background

Historically, telephonic communications (i.e. land lines) have been enabled using circuit switching infrastructure operated by phone companies. In contrast, mobile telephonic systems (i.e. mobile phones) have been enabled using packet switching infrastructure operated by mobile operators companies. As mobile telephonic communications have been deployed, such mobile telephonic communication systems are using the packet switching infrastructure for edge communications and the circuit switching infrastructure to complete long haul telephone calls. As mobile communication systems become more and more prevalent and mobile communication systems serve to provide more and more services (e.g. multimedia functions, sophisticated voice functions, video conferencing, etc.), usage is trending toward more and more functions suited to the packet switching infrastructure. Also, more and more equipment that connects to packet switching networks is being deployed; for example, femto cells, including user-deployed femto cells. Concurrently, more and more services (e.g. multimedia services, low-cost long distance calling, etc.) are being enabled using relatively more and more packet switching network infrastructure (e.g. the Internet and other IP-based networks).

This trend creates an environment where more and more of the infrastructure is deployed under control of entities other than the telephone system operators, thus new issues of security (e.g. secure registration of the aforementioned femto cells) come to the fore.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed are methods, apparatus, and systems to perform secure registration of a femto access point for trusted access to an operator-controlled network element. Method steps include establishing a security association for at least one said femto access point, and making a request using the security association to an operator-controlled network element. The operator-controlled network element then constructs a secure registration credential and sends the secure registration credential to the requesting femto access point, thus authorizing trusted access by the requesting femto access point to access operator-controlled network elements. Embodiments include establishing a security association via an IPsec security association received from a security gateway which is within an operator-controlled domain and using an operator-controlled database of IPsec inner addresses. In some embodiments the femto access point conducts message exchanges using one or more IMS protocols and components, including call session control function elements, which elements in turn may authorize a femto access point within the IMS domain and which may or may not access non-IMS network elements for authorization.

To the accomplishment of the foregoing and related ends, the embodiments of the invention are hereinafter fully described and particularly pointed out in the claims. The following description and the annexed drawings set forth in detail certain illustrative aspects of the one or more embodiments. These embodiments are indicative, however, of but a few of the various ways in which the principles of various embodiments can be employed, and the described aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings.

DESCRIPTION

Figure 1:
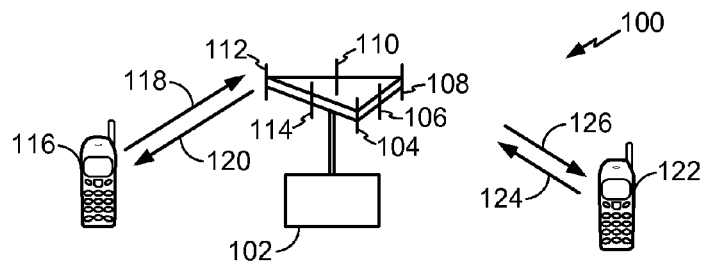
FIG. 1 illustrates a multiple access wireless communication system according to one embodiment of the invention.

Various aspects are now described with reference to the drawings, wherein like reference characters are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein, one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to, or other than, one or more of the aspects set forth herein. As an example, many of the methods, devices, systems and apparatuses described herein are described in the context of implementing a system to perform secure registration of femto access points in a wireless environment comprising disparate deployments of femto access points. One skilled in the art should appreciate that similar techniques could apply to other communication environments.

Wireless communication systems are widely deployed to provide various types of communication content such as voice, data, and so on. These systems may be multiple-access systems capable of supporting communication with multiple users by sharing the available system resources (e.g. bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Traditional fixed line communication systems, such as digital subscriber lines (DSLs), cable lines, dial-up networks, or like connections offered by Internet service providers (ISPs) are alternative and sometimes competing communication platforms to wireless communications. However, in recent years users have begun replacing fixed line communications with mobile communications. Several advantages of mobile communication systems, such as user mobility, small relative size of user equipment (UE), and ready access to public switched telephone networks as well as the Internet, have made such systems very convenient and thus very popular. As users have begun relying more and more on mobile systems for communication services traditionally obtained through fixed line systems, demand for increased bandwidth, reliable service, high voice quality, and low prices has intensified.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out, or a multiple-in-multiple-out (MIMO) system.

In addition to mobile phone networks currently in place, a new class of small base stations has emerged. These small base stations are low power and can typically utilize fixed line communications to connect with a network operator's core network. In addition, these base stations can be distributed for personal/private use in a home, office, apartment, private recreational facility, and so on, to provide indoor/outdoor wireless coverage to mobile units. These personal base stations are generally known as femto cells, or personal femto access points, or access points, or home node B units (HNBs), or home-evolved eNode B units (HeNBs). Typically, such miniature base stations are connected to the Internet and the operator's network via a DSL router or cable modem. Femto cell base stations offer a new paradigm in mobile network connectivity, allowing direct subscriber control of mobile network access and access quality.

Development of varying types of wireless access points to communication networks (e.g. public land mobile networks (PLMNs), network operators, mobile operator core networks, etc.) have been one solution offered to effect convergence between traditional wireless communication systems and traditional fixed-line communication systems. The convergence, otherwise known as fixed-wireless convergence, involves a degree of interoperability between fixed line networks (e.g. intranet, Internet, etc.) and mobile communication networks (e.g. cellular phone networks). A femto access point, as described herein, includes any suitable node, router, switch, hub, or the like, configured to communicatively couple an access terminal (AT) with a communication network. The femto access point can be wired (e.g. employing Ethernet, universal serial bus (USB), or other wired connection for communication), wireless (e.g. employing radio signals for communication), or both. Examples of femto access points include access point base stations (BSs), wireless local area network (WLAN) access points, wireless wide area network (WWAN) access points, including worldwide interoperability for microwave access (WiMAX) BSs, and the like. Femto access points comprise access points to a communication operator's network, such as a mobile communication operator's network, a circuit-switched voice network, a combined circuit-switched and packet-switched voice and data network (or all-packet voice and data network), or the like. Examples of a femto access point include a Node B (NB), base transceiver station (BTS) a home Node B (home NodeB, Home Node B, HNB), a home-evolved eNode B (HeNB), or simply a BS, of various transmit power/cell size including macro cells, micro cells, pico cells, femto cells, etc. Consistent with the aforementioned trends, successive deployments of femto cells can be expected to have more and more IP Multimedia Subsystem (IMS)-based functionality. Thus, a femto access point might include sufficient IMS functionality so as to be described as an IMS client femto access point.

The introduction of various types of femto access points into traditional macro BS networks enables significant flexibility and consumer control over personal access to such networks. User terminals can often be configured to select a nearby femto access point or a macro network BS, depending upon which provides a better signal and/or other factors. In addition, femto access points can provide preferable rate plans compared with the macro network, at least in some circumstances, enabling users to reduce usage charges.

As wireless communication bandwidth and data rates have increased over time, and as AT processing and user interface capabilities have become more sophisticated, users are able to employ mobile devices to perform functions formerly available only with personal computers and fixed line communications.

However, because typical macro networks are often deployed with large-scale public usage as the primary market, indoor reception can often be poorer than outdoor reception (e.g. due to the absorption of radio frequency signals by buildings, insulation, ground landscaping, etc.), rendering a mobile device less effective than a fixed-line computer in such an environment. Femto access point BSs can provide significant improvement in this environment, however. As one example, HNB and HeNB technology (hereinafter referred to collectively as HNB) provide a user with significant control over personal wireless connectivity, indoors and outdoors, often obviating most or all such connectivity problems. HNBs, therefore, can further extend AT mobility even in an environment that is sub-optimal for macro networks.

Along with the significant advantages of HNB and other access point deployments, come opportunities for new services, and along with new services some problems have come to the fore. For instance, mobile cellular services continue to extend voice services (e.g. phone calls, voicemail, etc.) and text services (e.g. SMS) to include services that are dependent on Internet content (e.g. news, pictures, video, etc.) and/or enabled by Internet applications (real-time location services, online gaming, etc.). In some situations, a mobile user terminal (AT) may provide services—even without the participation of the mobile operator core infrastructure—using solely Internet Protocol (IP) networks. As mobile operator communication service offerings adopt more and more IP technology, the overall service offerings are converging. Converged communication services are becoming universally available on a variety of increasingly autonomous devices (e.g. ATs, PDAs, smart phones, and laptops).

In some cases a session for executing an application may be started and fully completed even without the use of a mobile operator's core network infrastructure. In other cases, an application may be downloaded and installed onto an autonomous device. For example, an application conforming to the IMS centralized services specification might establish a peer-to-peer session, carry out some protocol implementing aspects of the application, exchange multimedia content, and close the peer-to-peer session.

IMS was originally conceived as part of the 3rd Generation Partnership Project (3GPP) specification for third generation (3G) cell phone networks. The 3rd Generation Partnership Project specifications define characteristics of IMS to deliver new services and applications to 3G cell phone users. Part of the specification ensures that IMS is independent of the access network so that network operators can offer new services over different types of radio interface and different types of cell phones.

For example, convergence addresses many technological and deployment issues including security, roaming, and quality of service (QoS). Of these, aspects of managing security are disclosed herein. A security protocol attempts to ensure proper user authentication, authorization, and privacy. In some embodiments, a user's access terminal is authenticated (i.e. through a sign-on procedure), and this authentication is used to access a range of services to which the user has access.

Of course any network-oriented authentication and/or authorization procedure is subject to threats including compromise of credentials (e.g. cloning of credentials), malicious attacks (e.g. configuration attacks, fraudulent software updates), malicious protocol attacks (e.g. man-in-the-middle attacks), denial of service attacks, attacks against user identity or network operator identity (e.g. spoofed SIP messages such as INVITE or BYE) and user privacy (e.g. eavesdropping) attacks related to a network use of any particular susceptible protocol (e.g. SAE/TLE TS33.401) or deployment concept (e.g. the closed subscriber group concept) or any of myriad other attacks. Accordingly, network operators may employ countermeasures to neutralize such threats. Some exemplary countermeasures include techniques for mutual authentication, security tunnel establishment for backhaul links, use of trusted environment techniques inside network components, security mechanisms for operation, administration, and maintenance (OAM), hosting party authentication techniques, etc.

In the deployment of 3GPP network infrastructure, femto access point deployment is typically unplanned or semi-planned, meaning that femto access points are installed outside of the control of the network operator. Thus, the operator has limited capacity to implement secure deployment of these femto access points. A femto access point might be deployed in an unsecured physical location, and may thus be physically exposed to malicious intentions. Again referring to security threats involved in the deployment of femto access points, femto access points may use Session Initiation Protocol (SIP) procedures as specified in IETF RFC 3261, 3GPP and 3GPP2 IMS specifications to register themselves to the operator's network in order to provide network services (e.g. GSM services, UMTS, CDMA2000, circuit switched services, etc.). In order to ensure that these procedures are not abused by femto access points that may be deployed in unsecured physical locations, a secure method is required to register such femto access points to the network.

For illustrative purposes the following paragraphs introduce terms used in describing embodiments of the invention.

As is known in the art, and according to various embodiments of the invention, an AT is capable to communicate a mobile station identification (MSID). In cases when an AT can have multiple identities, the user or AT selects a particular mobile station identity (i.e. under user control, or autonomously by the AT) to be in effect during the session. The MSID can be either a mobile identification number (MIN) or an international mobile station identity (IMSI). A Mobile Identification Number is a 34-bit number that is a digital representation of the 10-digit number assigned to a mobile station. An international mobile station identity is a number up to 15 digits in length that uniquely identifies a mobile station internationally.

The techniques described herein can be used for various wireless communication systems such as code division multiple access (CDMA), time division multiple access (TDMA), frequency division multiple access (FDMA), orthogonal FDMA (OFDMA), SC-FDMA (single carrier FDMA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA.

CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of the Universal Mobile Telecommunication System (UMTS). Long term evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Single carrier frequency division multiple access (SC-FDMA), which utilizes single carrier modulation and frequency domain equalization, is a technique that has similar performance and essentially the same overall complexity as those of OFDMA systems. An SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for the uplink multiple access scheme in 3GPP Long Term Evolution (LTE) or Evolved UTRA.

As used in the subject disclosure, the terms "component", "system", "module" and the like are intended to refer to a computer-related entity, either hardware, software, software in execution, firmware, middleware, microcode, and/or any combination thereof. For example, a module can be, but is not limited to being, a process running on a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g. data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc. described with regard thereto, and are not limited to the precise configurations set forth in a given figure, as will be appreciated by one skilled in the art.

Furthermore, various aspects are described herein in connection with an access terminal. An AT can also be called a system, subscriber unit, subscriber station, mobile station, mobile communication device, mobile device, remote station, remote terminal, access terminal (AT), user agent (UA), user device, user equipment (UE), or the like. A subscriber station can be a cellular telephone, cordless telephone, Session Initiation Protocol (SIP) phone, wireless local loop (WLL) station, personal digital assistant (PDA), handheld device having wireless connection capability, or other processing device connected to a wireless modem or similar mechanism facilitating wireless communication with a processing device.

As used herein, a computer storage media can be any physical media that can be accessed by a computer. By way of example and not limitation, such storage media can comprise RAM, ROM, EEPROM, CD-ROM or other optical disk storage, magnetic disk storage, or other magnetic storage devices, smart cards, and flash memory devices (e.g. card, stick, key drive, etc.), or any other suitable medium that can be used to carry or store program code in the form of instructions or data structures and that can be accessed by a computer. Hardware communication media can include any suitable device or data connection that facilitates transfer of a computer program from one entity to another and, at least in part, using electrical, mechanical, and/or electromechanical hardware. In general, a data connection is also properly termed a computer-readable medium. For example, if a program, software or other data is transmitted from a website, server, or other remote source using a coaxial cable, fiber optic cable, twisted pair, digital subscriber line (DSL), communication bus structure, Ethernet, or wireless technologies such as infrared, radio, and microwave, then the coaxial cable, fiber optic cable, twisted pair, DSL, or wireless technologies such as infrared, radio, and microwave are included in the definition of medium, and any suitable hardware components associated with such medium are included in the definition of hardware communication media. Disk and disc, as used herein, includes compact disc (CD), laser disc, optical disc, digital versatile disc (DVD), floppy disk, and blu-ray disc, where disks usually reproduce data magnetically and discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a device-readable medium, machine-readable medium, and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or is clear from the context to be directed to a singular form.

Referring to FIG. 1, a multiple access wireless communication system 100 according to one embodiment is illustrated. A femto access point 102 (AP) includes multiple antenna groups, one antenna group including antennae 104 and 106, another antenna group including antennae 108 and 110, and an additional antenna group including antennae 112 and 114. In FIG. 1, only two antennae are shown for each antenna group; however, more or fewer antennae may be used for each antenna group. Access terminal 116 (AT) is in communication with antennae 112 and 114, where antennae 112 and 114 transmit information to access terminal 116 over a forward link 120 and receive information from access terminal 116 over a reverse link 118. Access terminal 122 is in communication with antennae 106 and 108, where antennae 106 and 108 transmit information to access terminal 122 over a forward link 126 and receive information from access terminal 122 over a reverse link 124. In a frequency division duplex (FDD) system, communication links 118, 120, 124 and 126 may use different frequencies for communication. For example, forward link 120 may use a different frequency then that used by reverse link 118.

Each group of antennae and/or the area in which they are designed to communicate is often referred to as a sector of the femto access point. In the embodiment of FIG. 1, antenna groups each are designed to communicate with access terminals in a sector of the areas covered by femto access point 102.

In communication over forward links 120 and 126, the transmitting antenna of femto access point 102 use beamforming in order to improve the signal-to-noise ratio of forward links for the different access terminals 116 and 122. Also, a femto access point using beamforming to transmit to access terminals scattered randomly throughout its coverage causes less interference to access terminals in neighboring cells than a femto access point transmitting through a single antenna to all its access terminals.

A femto access point may be a fixed station used for communicating with the terminals and may also be referred to as an access point, a Node B, an evolved Node B (eNB), or some other terminology. An access terminal may also be called user equipment (UE), a wireless communication device, a terminal, or an access terminal may be called a term consistent with some other terminology.

Figure 2:
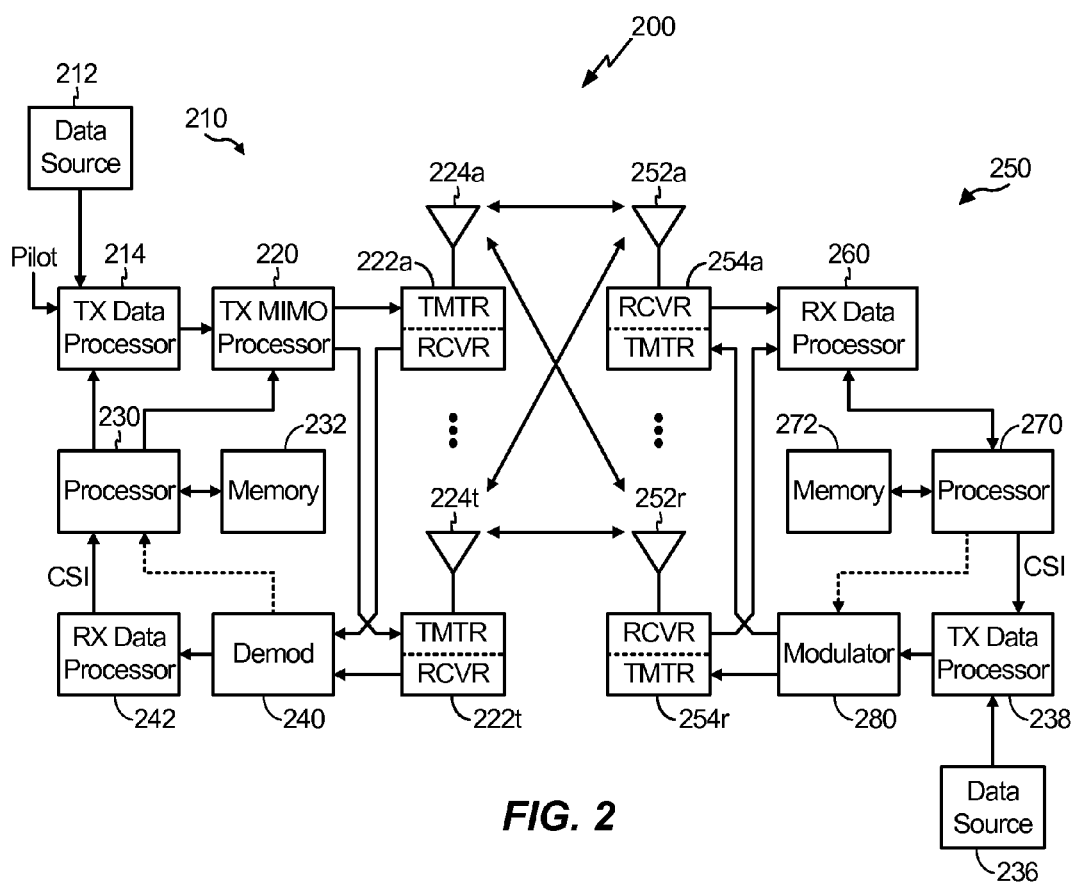
FIG. 2 is a block diagram of a transmitter system and a receiver system according to one embodiment of the invention.

FIG. 2 is a block diagram of an embodiment of a transmitter system 210 (also known as the femto access point) and a receiver system 250 (also known as the access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e. symbol mapped) based on a particular modulation scheme (e.g. BPSK, QSPK, M-PSK or M-QAM) selected for that data stream to provide modulation symbols. The data rate, coding and modulation for each data stream may be determined by instructions performed by processor 230 using memory 232.

The modulation symbols for all data streams are then provided to a TX MIMO processor 220, which may further process the modulation symbols (e.g. for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transceiver 222 receives and processes a respective symbol stream to provide one or more analog signals, and further conditions (e.g. amplifies, filters and upconverts) the analog signals to provide a modulated signal suitable for transmission over the MIMO channel. $N_T$ modulated signals from transceivers 222a through 222t are then transmitted from $N_T$ antennae 224a through 224t, respectively.

At receiver system 250, the transmitted modulated signals are received by $N_R$ antennae 252a through 252r, and the received signal from each antenna 252 is provided to a respective receiver (RCVR) 254a through 254r. Each receiver 254 conditions (e.g. filters, amplifies and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270, using memory 272, periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236 that is then modulated by a modulator 280, conditioned by transmitters 254a through 254r, and transmitted back to transmitter system 210.

At transmitter system 210, the modulated signals from receiver system 250 are received by antennae 224, conditioned by transceivers 222, demodulated by a demodulator 240, and processed by an RX data processor 242 to extract the reserve link message transmitted by the receiver system 250. Processor 230 then determines which pre-coding matrix to use for defining the beamforming weights and processes the extracted message.

In an aspect, logical channels are classified into Control Channels and Traffic Channels. Logical Control Channels comprise a Broadcast Control Channel (BCCH), which is a DL channel for broadcasting system control information, and a Paging Control Channel (PCCH), which is a DL channel for transferring paging information. A Multicast Control Channel (MCCH) is a point-to-multipoint DL channel used for transmitting Multimedia Broadcast and Multicast Service (MBMS), scheduling, and control information for one or several MTCHs. Generally, after establishing an RRC connection, this channel is only used by ATs that receive MBMS (Note: old MCCH+MSCH). A Dedicated Control Channel (DCCH) is a point-to-point bi-directional channel that transmits dedicated control information and is used by ATs having an RRC connection. In an aspect, Logical Traffic Channels comprise a Dedicated Traffic Channel (DTCH)—a point-to-point bi-directional channel dedicated to one AT—for the transfer of user information, and a Multicast Traffic Channel (MTCH) for point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH), and a Paging Channel (PCH), where the PCH for support of AT power saving (a DRX cycle is indicated by the network to the AT) broadcasted over the entire cell and mapped to PHY resources that can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

Figure 3:
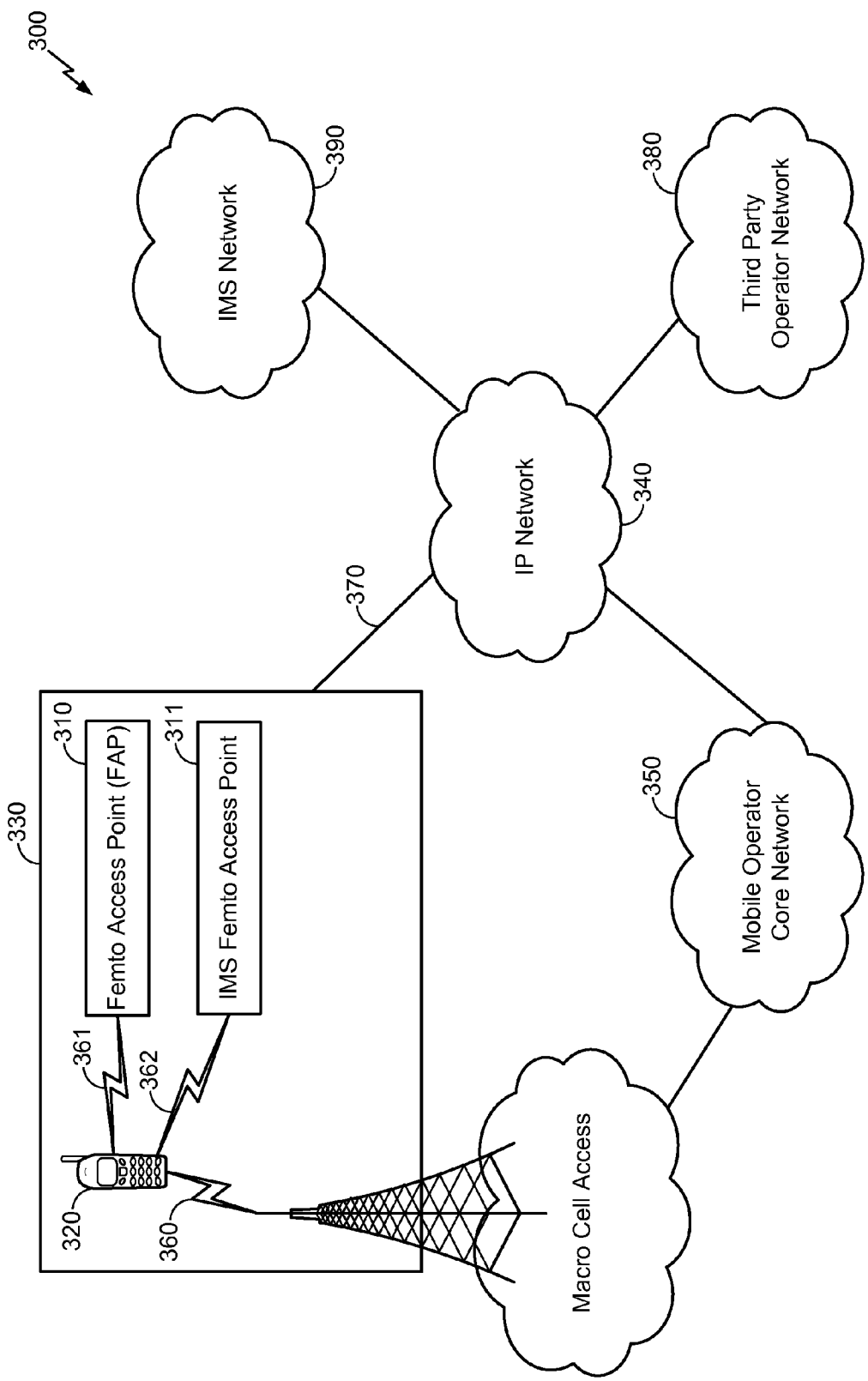
FIG. 3 depicts a communication system to enable deployment of femto access points within a network environment according to one embodiment of the invention.

The DL PHY channels comprise:
Acknowledgement Channel (ACKCH)
Common Control Channel (CCCH)
Common Pilog Channel (CPICH)
DL Physical Shared Data Channel (DL-PSDCH)
Load Indicator Channel (LICH)
Multicast Control Channel (MCCH)
Paging Indicator Channel (PICH)
Shared DL Control Channel (SDCCH)
Shared UL Assignment Channel (SUACH)
Synchronization Channel (SCH)
UL Power Control Channel (UPCCH)
The UL PHY Channels comprise:
Acknowledgement Channel (ACKCH)
Antenna Subset Indicator Channel (ASICH)
Broadband Pilot Channel (BPICH)
Channel Quality Indicator Channel (CQICH)
Physical Random Access Channel (PRACH)
Shared Request Channel (SREQCH)
UL Physical Shared Data Channel (UL-PSDCH)
For the purposes of the present document, the following abbreviations apply:
AMD Acknowledged Mode Data
ARQ Automatic Repeat Request
AT Access Terminal
ATM Acknowledged Mode
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CSG Closed Subscriber Group
CTCH Common Traffic CHannel
DCCH Dedicated Control CHannel
DCH Dedicated CHannel
DL DownLink
DL-SCH downlink shared channel
DSCH Downlink Shared CHannel
DTCH Dedicated Traffic CHannel
FACH Forward link Access CHannel
FDD Frequency Division Duplex
HLR Home Location Register
HNBID Femto cell ID
HSS Home Subscriber Server
I-CSCF Interrogating Call Session Control Function
IMS IP Multimedia Subsystem
IMSI International Mobile Station Identity
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN multicast broadcast single frequency network
MCCH MBMS point-to-multipoint Control CHannel
MCE MBMS coordinating entity
MCH multicast channel
MRW Move Receiving Window
MSB Most Significant Bit
MSC Mobile Switch Center
MSCH MBMS point-to-multipoint Scheduling CHannel
MSCH MBMS control channel
MTCH MBMS point-to-multipoint Traffic Channel
NASS Network Attachment SubSystem
P2P Peer-To-Peer
PCCH Paging Control CHannel
PCH Paging CHannel
P-CSCF Proxy Call Session Control Function
PDCCH physical downlink control channel
PDSCH physical downlink shared channel
PDU Protocol Data Unit
PHY PHYsical layer
PhyCH Physical CHannels
RACH Random Access Channel
RACS Resource and Admission Control Subsystem
RLC Radio Link Control
RRC Radio Resource Control
SAP Service Access Point
S-CSCF Serving Call Session Control Function
SDU Service Data Unit
SeGW Secure Gateway
SHCCH SHared channel Control Channel
SIP Session Initiation Protocol
SLF Subscriber Location Function
SN Sequence Number
SUFI SUper FIeld
TCH Traffic CHannel
TDD Time Division Duplex
TFI Transport Format Indicator
TISPAN Telecoms & Internet converged Services & Protocols for Advanced Networks
TM Transparent Mode
TMD Transparent Mode Data
TMSI Temporary Mobile Subscriber Identity
TTI Transmission Time Interval
U- User-
UE User Equipment
UL UpLink UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network FIG. 3 depicts an exemplary communication system 300 to enable deployment of femto access point BSs (e.g. HNBs) within a network environment. The communication system 300 includes multiple femto access points embodied as femto access point(s) 310 and/or IMS femto access point(s) 311, which are installed in small-scale network environments. Examples of small-scale network environments can include virtually any indoor and/or indoor/outdoor facility 330. The femto access point(s) 310 can be configured to serve associated access terminals 320 (ATs)—e.g. those ATs as may be included in an access group (e.g. CSG) associated with a femto access point—or optionally configured to serve alien or visitor access terminals 320. An access terminal 320 communicates with a macro cell over wireless link 360, and communicates with one or more femto access points 310 and/or with one or more IMS femto access points 311 over a wireless link 361 and/or over a wireless link 362. Each femto access point (e.g. femto access point 310 and/or IMS femto access point 311) is further coupled to the IP network 340 via a DSL router (not shown) or, alternatively, a cable modem, broadband over power line connection, satellite IP network connection, or a like broadband IP network connection 370. Additional networks are accessible through the IP network 340, including a mobile operator core network 350, an IMS network 390, and/or a third party operator network 380. A mobile operator core network may include a mobile switch center (MSC).

In some embodiments, a femto access point 310 communicates with a femto access point gateway. A femto access point gateway may be embodied as an HNB gateway (HNB-GW), or a home-evolved eNodeB gateway (HeNB-GW), or another gateway device capable of carrying out a message exchange under computer control.

The femto access point 310 might be embodied as Home NodeB units (HNBs), or Home-evolved NodeB units (HeNBs). As shown, the access terminal 320 is capable to operate in a macro cellular environment and/or in a residential small-scale network environment, using various techniques described herein. Thus, at least in some disclosed aspects, femto access point 310 can be backward-compatible with any suitable existing access terminal 320. It should be appreciated that although aspects described herein employ 3GPP specifications, it is to be understood that the aspects can also be applied to 3GPP variants (Release 99 [Rel99], Rel5, Rel6, Rel7), as well as 3GPP2 technology (1xRTT, 1xEV-DO Rel0, RevA, RevB) and other known and related technologies. In such embodiments described herein, the owner of the HNB 310 subscribes to a mobile service such as, for example, a 3G mobile service offered through the mobile operator core network 350. The access terminal 320 is capable to operate both in a macro cellular environment and in a residential or private enterprise small scale network environment. The femto access point 310 is backward compatible with any existing access terminal 320.

In some embodiments of the invention, femto access points (FAPs) may be deployed for interfacing within IP Multimedia Subsystem (IMS) environments in order to provide network services such as GSM, UMTS, LTE/Dual mode, CDMA2000, circuit switched services, etc. In order to ensure that such deployments are not open to abuse by FAPs (which may be hosted in locations that are not known to be trusted by the network operator), it would be advantageous to provide a secure method and apparatus to register the FAPs to the network.

Figure 4:
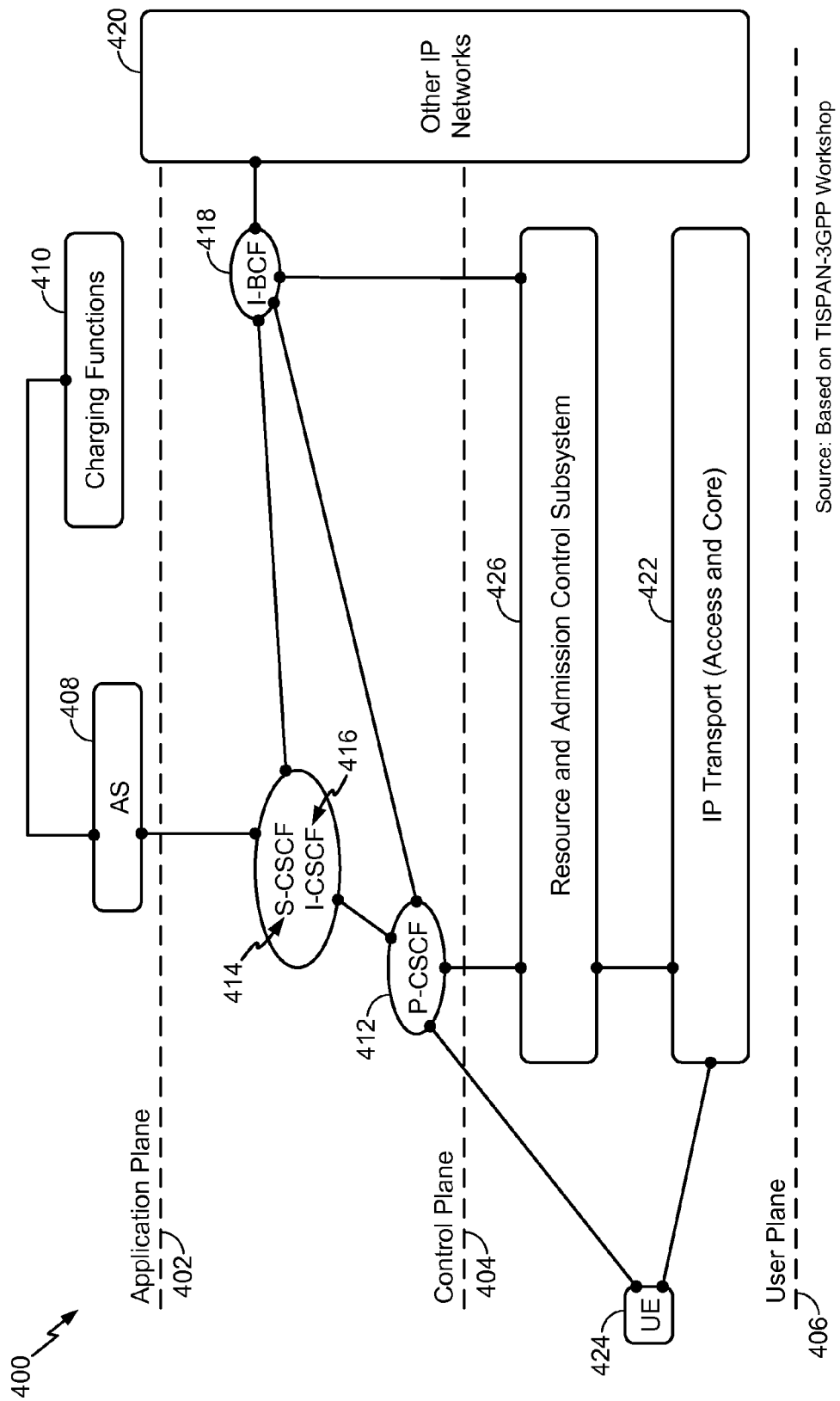
FIG. 4 is an IMS environment within which establishing secure registration of a femto access point may be practiced, in accordance with one embodiment of the invention.

In some embodiments of the invention, femto access points (FAPs) or HNBs use SIP procedures as specified in IETF RFC 3261 and 3GPP and 3GPP2 IP Multimedia Subsystem (IMS) specifications to register themselves to the operator's network in order to provide network services such as GSM, UMTS, LTE/Dual mode, CDMA2000, and circuit switched services. In order to ensure that such procedures are not abused by FAPs (which may be hosted in locations that are not known to be trusted by the network operator), it would be advantageous to provide a secure method and apparatus to register the FAPs to the network FIG. 4 is an IMS environment within which environment establishing secure registration of a femto access point may be practiced, in accordance with one embodiment of the invention. As an option, the present environment 400 may be exist in the context of the architecture and functionality of FIG. 1 through FIG. 3.

The IMS architecture as shown organizes the networking infrastructure into separate planes with standardized interfaces between them. Each interface is specified as a reference point that defines the protocol and functions. Functions may be mapped to any one or more planes; a single device may contain several functions.

The environment 400 is organized into three planes: an application plane 402, a control plane 404, and a user plane 406.

The application plane 402 provides an infrastructure for the provision and management of services, and defines standard interfaces to common functionality including configuration storage, identity management, user status (such as presence and location), and other functions. In some cases, data corresponding to any of the foregoing may be stored and managed by a Home Subscriber Server (HSS).

The application plane 402 may contain multiple application servers 408 (ASs) for performing various services (e.g. a Telephony Application Server, an IP Multimedia Services Switching Function, an Open Service Access Gateway, and so on). The application servers are responsible for performing functions for managing subscriber sessions, including maintaining the state of a telephonic call. Service providers may deploy one or more application servers to enable creating new applications. Further, the application plane provides infrastructure for the provision of charging functions 410 and other billing-related services. The application plane provides an infrastructure for control of voice and video calls and messaging to which further services may be provided by functions within the control plane.

As shown, the control plane 404 is logically disposed between the application plane 402 and the user plane 406. In exemplary cases, the control plane routes the call signaling, performs aspects of authentication and authorization, and performs some privacy functions. Functions within the control plane may interface with charging functions 410 and may generate certain types of billing-related services.

In some embodiments, the control plane orchestrates logical connections between various other network functions, and may facilitate registration of end-points, routing of SIP messages, and overall coordination of media and signaling resources. As shown, the control plane includes call session control functions, which may be implemented cooperatively by a proxy CSCF (shown as P-CSCF 412), a serving CSCF (shown as S-CSCF 414) and an interrogating CSCF (shown as I-CSCF 416). The control plane may also include a Home Subscriber Server (HSS) database. The HSS maintains a service profile for each end user, including registration information, preferences, roaming information, voicemail options, buddy lists, etc. In addition, the HSS may maintain service profile information related to femto access points (e.g. femto access point 310 and/or IMS femto access point 311). The centralization of subscriber information may facilitate provisioning of services, consistent application access, and profile sharing among multiple access networks. In some cases, a Home Location Register (HLR) may be reachable over a network and may operate instead of (or cooperatively with) an HSS. Multiple core networks 420 (e.g. mobile operator core network 350) may be reached through an interconnection border control function component 418. Access into a core network 420 is through a border gateways (e.g. I-BCF 418). A border gateway may be deployed to enforce an access policy and may control traffic flows to and from the core networks 420. In some embodiments, the interconnect border control function (I-BCF) controls transport level security and tells the RACS 426 what resources are required for a call The control plane 404 implements a call session control function (CSCF), which comprises the following:

A Proxy CSCF (P-CSCF 412) is the first point of contact for users with the IMS. The P-CSCF is responsible for security of the messages between the network and the user as well as allocating resources for the media flows.

An Interrogating CSCF (I-CSCF 416) is the first point of contact from peered networks. The I-CSCF is responsible for querying the HSS to determine the S-CSCF for a user and may also hide the operator's topology from peer networks (e.g. using a Topology Hiding Inter-network Gateway, or THIG).

A Serving CSCF (e.g. S-CSCF 414) is responsible for processing registrations to record the location of each user, user authentication, and call processing (including routing of calls to applications). The operation of the S-CSCF may be controlled in part by policy stored in the HSS.

The user plane 406 provides a core QoS-enabled IPv6 network 422 for access from user equipment 422 (e.g. access terminal 320) over various networks (e.g. mobile, WiFi and broadband networks, etc.). This infrastructure is designed to provide a wide range of IP multimedia server-based and peer-to-peer (P2P) services.

Figure 5:
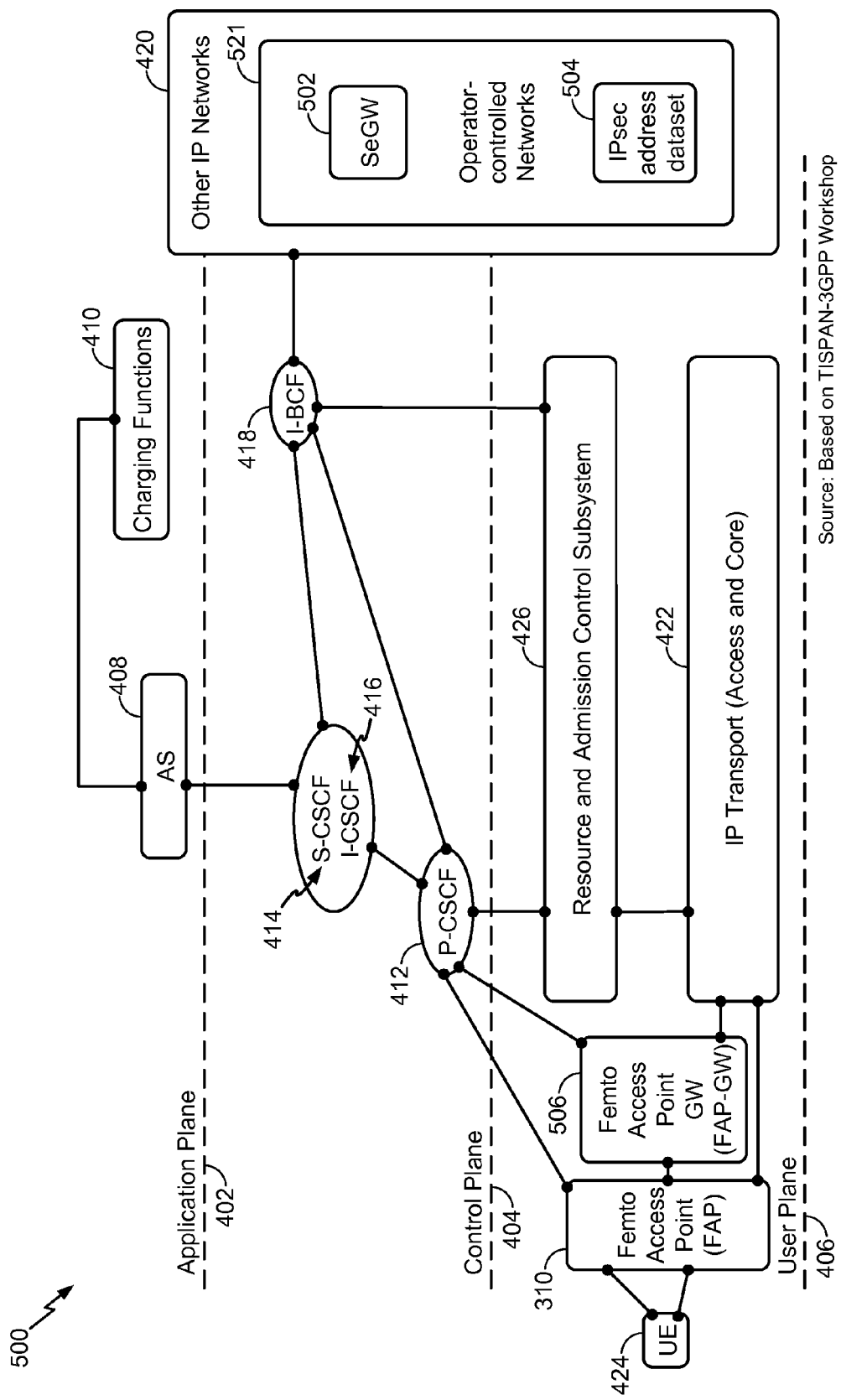
FIG. 5 is an IMS system including components for establishing secure registration of a femto access point, in accordance with one embodiment of the invention.

FIG. 5 is an IMS system including components for establishing secure registration of a femto access point, in accordance with one embodiment of the invention. As an option, the present system 500 may be implemented in the context of the architecture and functionality of FIG. 1 through FIG. 4. Of course, however, the system 500 or any operation therein may be carried out in any desired environment.

Differences shown in FIG. 5 as comparing with FIG. 4 include the appearance of a femto access point 310 in connection with the user equipment 424, the appearance of a femto access point gateway 506 (FAP-GW), and the appearance of a representation of operator-controlled networks 521, which (as shown) includes a secure gateway (e.g. SeGW 502), and an operator-controlled IPsec address dataset 504.

In some embodiments, one or more femto access points 310 may use SIP to register themselves to the S-CSCF in the IMS domain. Certain procedures and/or rules may be invoked for providing a network environment and protocol for assuring secure and threat-resistant registration. For example:

The FAP mutually authenticates itself to a secure gateway (e.g. SeGW) located in an operator's network and establishes a secure tunnel (e.g. IPSec ESP);

The FAP shall not forward or process any IP packets from others with a source IP address having the same address as the addresses defended by the FAP (e.g. IPSec Tunnel Inner Header source IP address, FAP's source IP address);

Any SIP messages originating at the FAP 310 shall use IPSec tunnel inner address assigned by the SeGW (i.e. using an operator-controlled database of IPsec inner addresses);

The tunnel inner address space is to be under the control of the operator; and

The FAP subnet address is not reused for any other purposes by the communication network operator.

In addition to the above rules, other rules may apply.

Various authentication techniques for IMS registration have been proposed (e.g. IMS AKA, SIP Digest (with or without TLS), GPRS IMS Bundled Authentication, NASS IMS Bundled Authentication, Trusted Node Authentication or TNA (for ICS), etc. These authentication techniques and how they co-exist in IMS are defined by 3GPP in TS 33.203 (Rel-8), which specification is hereby incorporated by reference in its entirety.

Aforementioned techniques bring with their deployment additional requirements or problems. Embodiments of the invention described herein may use portions of the technique known as Trusted Node Authentication (TNA) for secure registration of femto access points. Assumptions relevant to various embodiments include:

A trusted node is either a node fully under an operator's control, or the node has been verified to be trusted (e.g. via some independent authentication, via software code-signing, etc.).

A trusted node (such as a FAP) inserts an integrity-protected flag (e.g. with value "auth-done").

The P-CSCF must not be present between the trusted node and the I/S-CSCF (i.e. otherwise, the P-CSCF may remove the integrity-protected flag).

Following such rules, once the FAP is authenticated by the home network (e.g. using FAP device authentication), components within the IMS domain can treat the FAP as a trusted node. In particular, performing IMS FAP registration can use a trusted node authentication technique; thus the FAP may be considered a trusted node once it has been authenticated to an operator's network. In some embodiments, a network operator might further verify that the FAP remains in a trusted state (e.g. by using methods such as secure boot, code signing etc.).

The heretofore described technique for FAP IMS registration does not require any additional configurations or development at the FAP; however, in some embodiments, the FAP can use the SIP Digest for IMS registration procedures.

Once the FAP has successfully registered using the one of the authentication methods, it can provide network services (e.g. circuit switched services, etc.) to ATs using the IMS infrastructure and using SIP messaging.

The system 500 embodies a communication system to perform secure registration of a femto access point for access to an operator-controlled network element. Shown are various functions, including a security gateway element (e.g. SeGW 502) configured for managing an IPsec address dataset 504 within the operator-controlled network 521. A femto access point (e.g. FAP 310) is configured for requesting a security association from the security gateway element and for requesting a secure registration credential from a network element within the operator-controlled network 521. Such an operator-controlled network element may be configured for constructing the requested secure registration credential and for sending the requested secure registration credential to the femto access point. The requested secure registration credential may be stored in a non-volatile memory or may be cached for a subsequent request for the same secure registration credential. The communication system includes at least one security gateway element for managing IPsec inner addresses (e.g. IPsec address dataset 504). As shown, the femto access point is configured for requesting a secure registration credential using a SIP message (see message 1140). In some cases the femto access point sends the request for a secure registration credential to a session control function (CSCF) element (e.g. P-CSCF 412, S-CSCF 414, I-CSCF 416, etc.). The communication system may exchange messages comprising a femto access point profile (such as the IMS identity of the femto access point) with an authorizing component, which may comprise a home subscriber server, one or more components within a mobile operator core network 350, and one or more components within a third party operator network 380.

Figure 6:
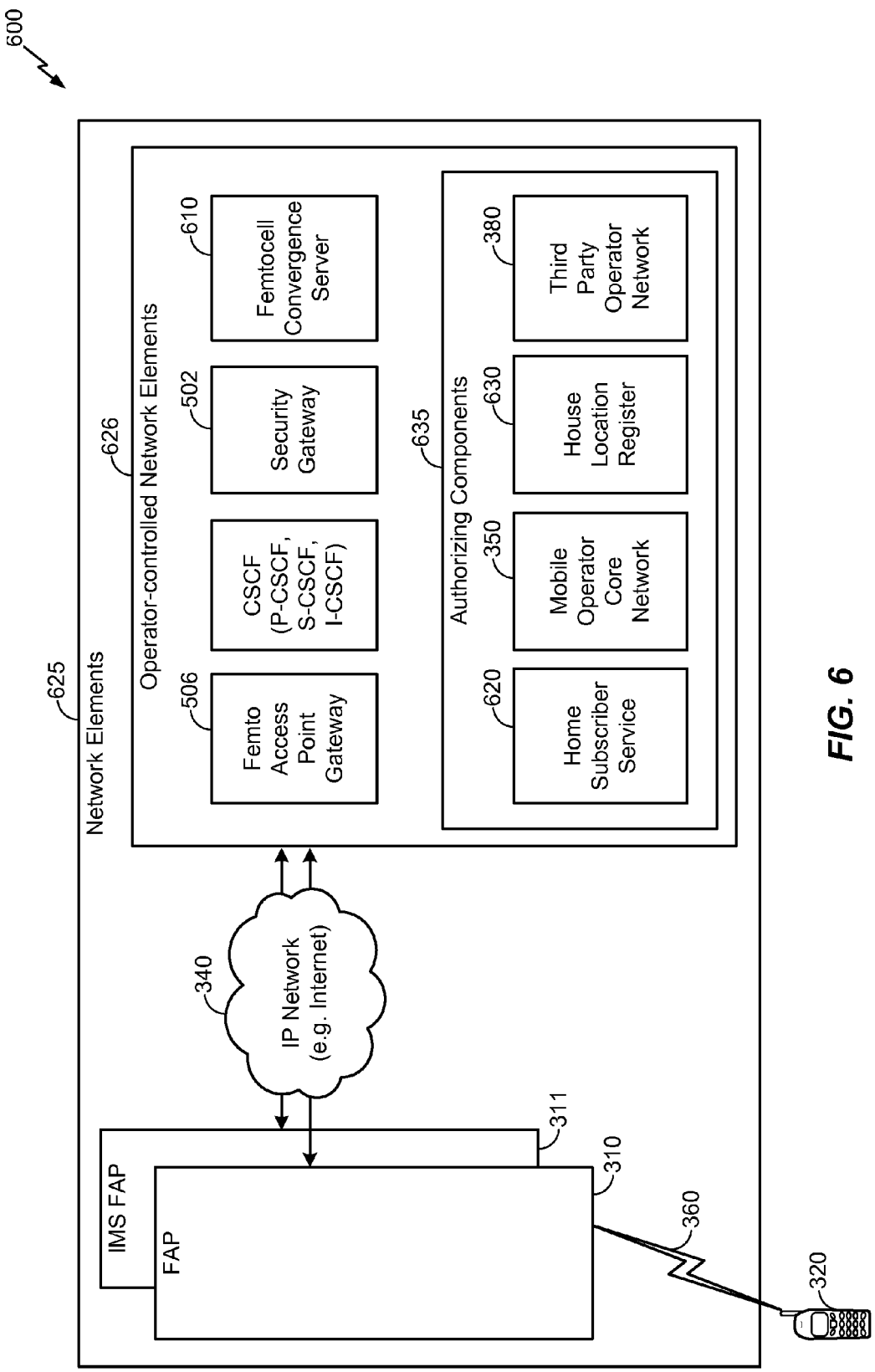
FIG. 6 is a representation of a system for establishing secure registration of a femto access point, in accordance with one embodiment of the invention.

FIG. 6 is a representation of a system for establishing secure registration of a femto access point, in accordance with one embodiment of the invention. As an option, the present system 600 may be implemented in the context of the architecture and functionality of FIG. 1 through FIG. 5. Of course, however, the system 600 or any operation therein may be carried out in any desired environment.

As shown, system 600 includes an access terminal 320 in communication over a wireless link (e.g. a wireless link 361, a wireless link 362) to one or more network elements 625. In particular, an access terminal 320 is shown in communication with a femto access point (e.g. a femto access point 310, an IMS femto access point 311). The femto access point is in turn in communication with IP network 340 (e.g. the Internet), which is in turn in communication with a plurality of operator-controlled network elements 626. In some embodiments, the operator-controlled network elements 626 include one or more authorizing components 635. The operator-controlled network elements 626 may include one or more operator-controlled network elements 626 (e.g. a FAP-GW 506, one or more CSCF components, one or more security gateways 502, and one or more femtocell convergence servers 610). A femtocell convergence server (FCS) may be included in an IMS environment, and serves as an interworking gateway for emulating protocols and functions of a mobile switch center (MSC) as well as acting or emulating as an IMS application server, translating between both to deliver existing MSC-related services to femto access points deployed in an IMS environment.

Also shown are authorizing components 635. Authorizing components may be comprised of one or more network components capable of performing one or more authorization operations for secure registration of femto access points. Examples of authorizing components 635 include an HSS 620, one or more components within a mobile operator core network 350 (e.g. an HLR 630), and one or more components within a third party operator network 380.

The femto access point gateway 506 (FAP-GW) serves for messaging by and between any network elements within the operator-controlled network elements 626 and by and between any one or more femto access points (e.g. femto access point 310, IMS femto access point 311) possibly involving a security gateway 502. The security gateway 502 may be embodied in a component separate from the femto access point gateway as shown, or the security gateway 502 may be embodied as a module within a femto access point gateway as is described infra.

Any one or more of the authorizing components 635 may include a list (e.g. IPsec address dataset 504), and the list may include an identifier or identifiers of various types. Further, the list may be organized so as to relate one type of identifier with another type of identifier (e.g. in a list of pairs, in a list of tables, etc.). Such a list may be stored in a memory and may include valid identifiers and/or valid pairs of identifiers for identifying valid access (e.g. any one or more access rights), or any relationship in any organization to an identifier that identifies valid access.

Any one or more of the network elements 625 may comprise a processor and a memory. For example, a femto access point 310 may comprise a femto access point processor and a femto access point memory. Similarly, a femto access point gateway 506 may comprise a femto access point gateway processor and a femto access point gateway memory.

In an embodiment of the invention, the system 600 may be used to perform secure registration of femto access points for access to an operator-controlled network element. More specifically, a femto access point (e.g. FAP 310, IMS FAP 311) may be configured for establishing a security association, which security association (e.g. including an IPsec inner address, etc.) may be used for requesting a secure registration credential from an operator-controlled network element 626 (e.g. a P-CSCF 412, an S-CSCF 414, etc.). Such an operator-controlled network element 626 may be configured for constructing the requested secure registration credential and sending (i.e. directly or via relay) the secure registration credential for access to an operator-controlled network element to the requesting femto access point. In some cases establishing a security association is established by function of a security gateway (SeGW 502, etc.), which function may be performed in conjunction with at least one operator-controlled network element using an operator-controlled database of IPsec inner addresses.

In exemplary embodiments, the femto access point may be configured for requesting registration using a SIP message sent to a call session control function element (e.g. P-CSCF 412, S-CSCF 414, I-CSCF 416, etc.). Of course a session control function element may be configured to maintain credentials, or a session control function element may be configured to obtain a secure registration credential via a network message exchange with an authorizing component 635 (e.g. HSS 620, HLR 630, mobile operator core network 350, third party operator network 380, etc.).

Any one or more of the aforementioned operator-controlled network elements 626 may be configured for relaying an access request from an access terminal (e.g. access terminal 320, UE 424, etc.), and the relayed access request may be relayed using a SIP message. Any one or more operator-controlled network element may be configured such that the relayed access request includes an integrity-protected indication.

Figure 7:
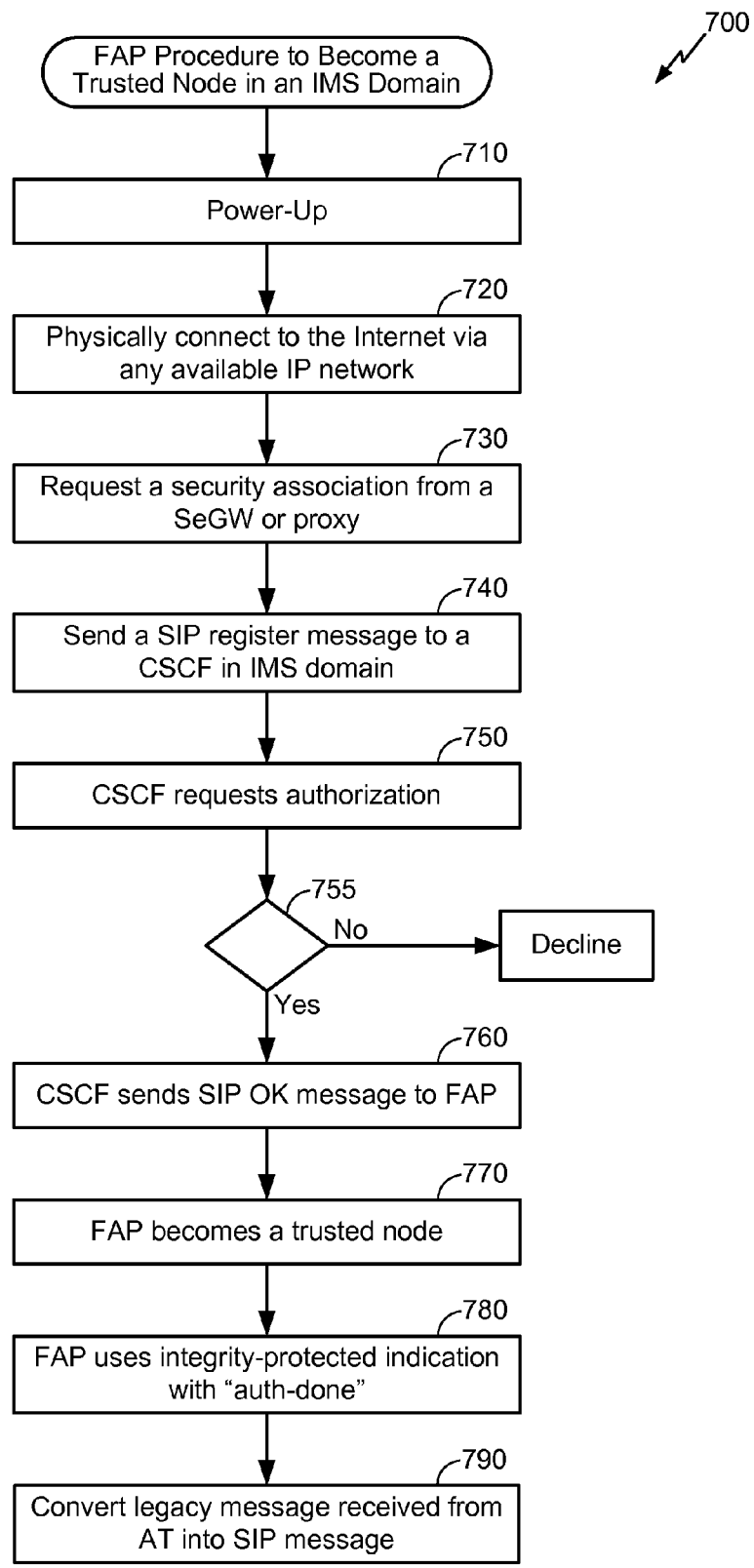
FIG. 7 is a flow diagram of processing used to perform secure registration of femto access points, in accordance with one embodiment of the invention.

FIG. 7 is a flow diagram of processing used to perform secure registration of femto access points, in accordance with one embodiment of the invention. As an option, the present system 700 may be implemented in the context of the architecture and functionality of FIG. 1 through FIG. 6. Of course, however, the system 700 or any operation therein may be carried out in any desired environment.

As shown, steps performed by a femto access point to become a trusted node in an IMS domain include powering up the femto access point component (see operation 710) and physically connecting to an IP network (see operation 720). Once a physical-layer connection is established, the femto access point commences to establish a connection at the MAC and link layers and, at some point, the femto access point requests a security association from a component within the IMS domain. The request for a security association may be granted by a security gateway (see operation 730), or a proxy for a security gateway being a member of the operator-controlled network elements 626. In embodiments of the invention, a femto access point is capable of processing SIP messages, and accordingly the femto access point sends a SIP register message (see operation 740), which message may be processed by a CSCF component within the IMS domain. In turn a CSCF component requests authorization by an authorizing component 635, the authorizing component 635 being a member of the operator-controlled network elements 626.

The CSCF requests authorization (in operation 750) and may then receive the requested authorization from the authorizing component. If so (see decision 755) the CSCF may send a SIP OK message to the requesting femto access point (see operation 760). Of course, it is possible that the request for authorization is declined, in which case the decision 755 results in declining the authorization request.

As shown, the CSCF that requested authorization (in operation 750) sends a SIP OK message to the requesting femto access point (see operation 760) and the requesting femto access point becomes a trusted node (see operation 770) within the network domain corresponding to the domain for which authorization was granted by the authorizing component 635.

As indicated above, the authorizing component may be an authorizing component within the set of operator-controlled network elements 626, and such authorizing component may be an HSS, an HLR, an authorizing component within a mobile operator core network, or an authorizing component within a third party operator network 380.

The femto access point that sent the SIP register message (as per operation 740) may then receive the requested authorization, and if so (see operation 770), the femto access point that sent the SIP register message becomes a trusted node within the authorized domain. In exemplary embodiments, the femto access point uses SIP messaging including the integrity-protected indication field set to "auth-done" (see operation 780). The femto access point commences to receive messages from an AT (a legacy AT, a UE, a SIP phone, etc.), and converts as needed into SIP (see operation 790).

Figure 8:
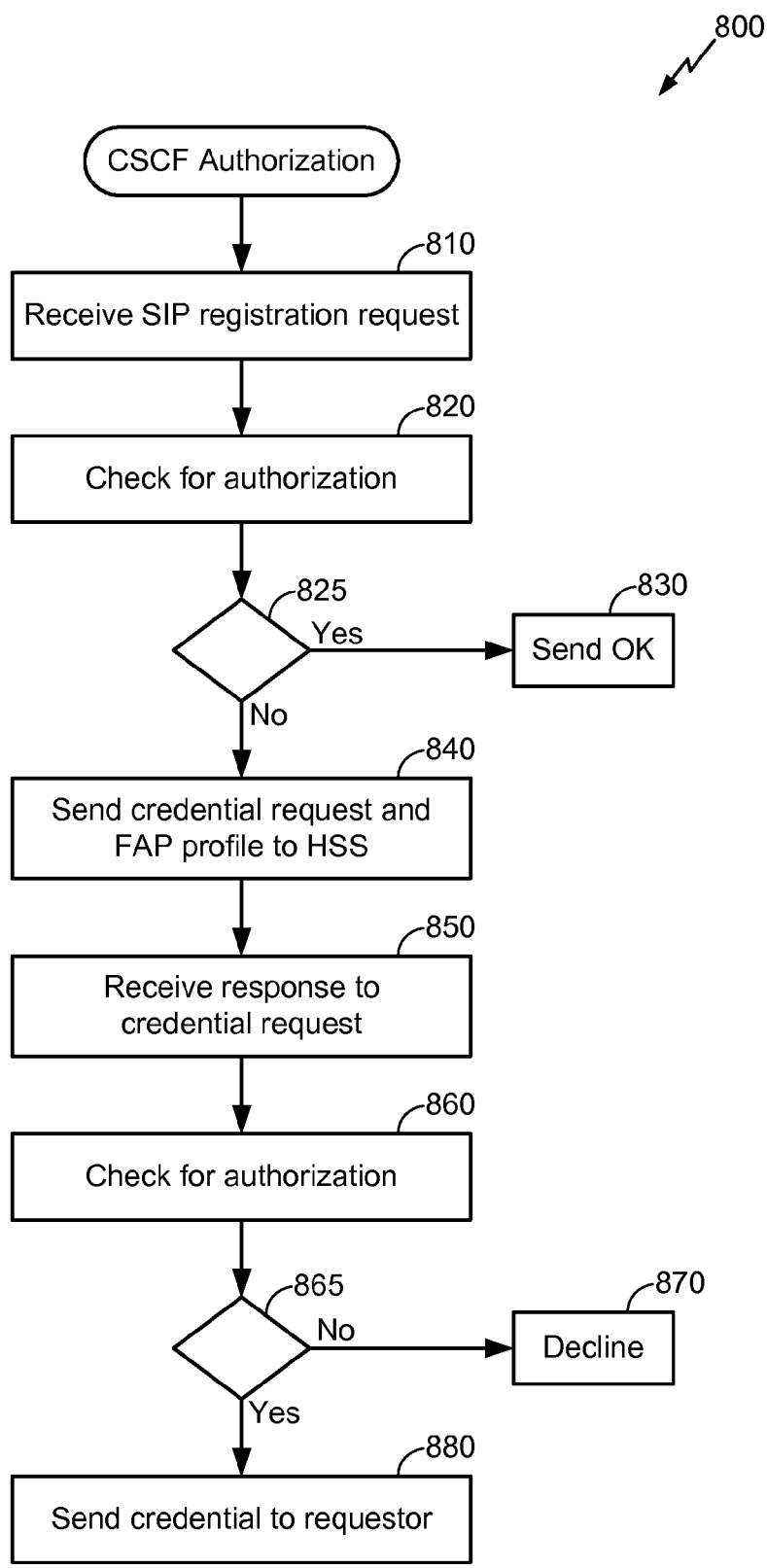
FIG. 8 is a flow diagram of processing used to secure a registration credential for a femto access point, in accordance with one embodiment of the invention.

FIG. 8 is a flow diagram of processing used to secure a registration credential for a femto access point, in accordance with one embodiment of the invention. As an option, the present system 800 may be implemented in the context of the architecture and functionality of FIG. 1 through FIG. 7. Of course, however, the system 800 or any operation therein may be carried out in any desired environment.

As shown, a CSCF (e.g. Serving CSCF 414) receives a SIP registration request (see operation 810) and performs a check (see operation 820) for an existing/current/valid authorization (see decision 825). If the device corresponding to the SIP registration request received in operation 810 is so authorized, the request is satisfied by an "OK" (see operation 830). Else, the registration request is interpreted as a request for a new authorization, and a request is made (see operation 840) to an authorizing component (e.g. an HSS, an HLR, a mobile operator core network, a third party operator network, etc.). The authorizing component may reply to the requestor, thus the CSCF receives the requested credential (see operation 850). In some cases additional checks as pertains to authorization might be performed (see operation 860), and if authorization tests succeed (see decision 865) the credential is sent to the requestor (e.g. a femto access point, or a femto access point gateway, etc.). Of course, checks as pertains to authorization might be performed (see operation 860) that fail the authorization test, in which case the registration request is declined (see operation 870). In some cases, the registration request is declined by returning a message indicating the reason for declining the request; in other cases no response is returned to the requestor, and the requestor does not receive the requested credential. In other cases, the registration request is accepted and the authorization credential is sent to the requestor (see operation 880).

Figure 9:
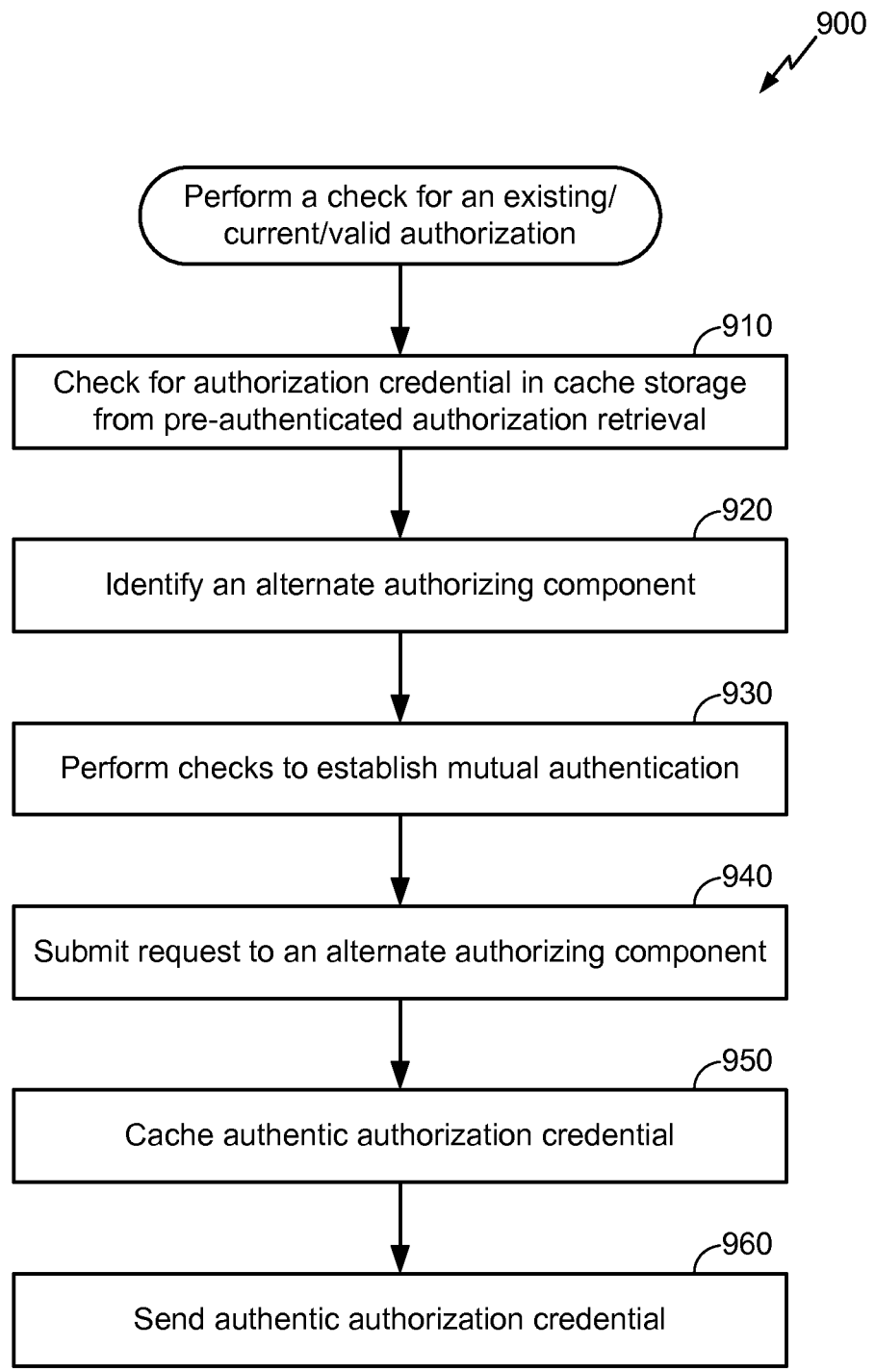
FIG. 9 is a flow diagram for performing a check for an existing/current/valid authorization for secure registration of a femto access point, in accordance with one embodiment.

FIG. 9 is a flow diagram for performing a check for an existing/current/valid authorization for secure registration of a femto access point. As an option, the present system 900 may be implemented in the context of the architecture and functionality of FIG. 1 through FIG. 8. Of course, however, the system 900 or any operation therein may be carried out in any desired environment.

System 900 may be invoked whenever an operator-controlled network element attempts to satisfy a request for authorization (see operation 820). In some cases, a CSCF or other operator-controlled network element may store authenticated authorizations of femto access points in a cache memory (see operation 910). In some cases an authenticated authorization for a femto access point may not be present in a cache memory, and a CSCF or other operator-controlled network element may attempt to retrieve an authentic authorization from an authorizing component 635. In such as case, the operator-controlled network element may select one or more authorizing components (see operation 920) and perform network messaging to establish the authenticity of the selected authorizing component (see operation 930). Once the aforementioned authentication steps have succeeded, the operator-controlled network element may then submit a request for an authorization credential (see operation 940), and having received such an authorization credential, may proceed to cache the credential (see operation 950) and send the credential to the requestor (see operation 960).

Figure 10:
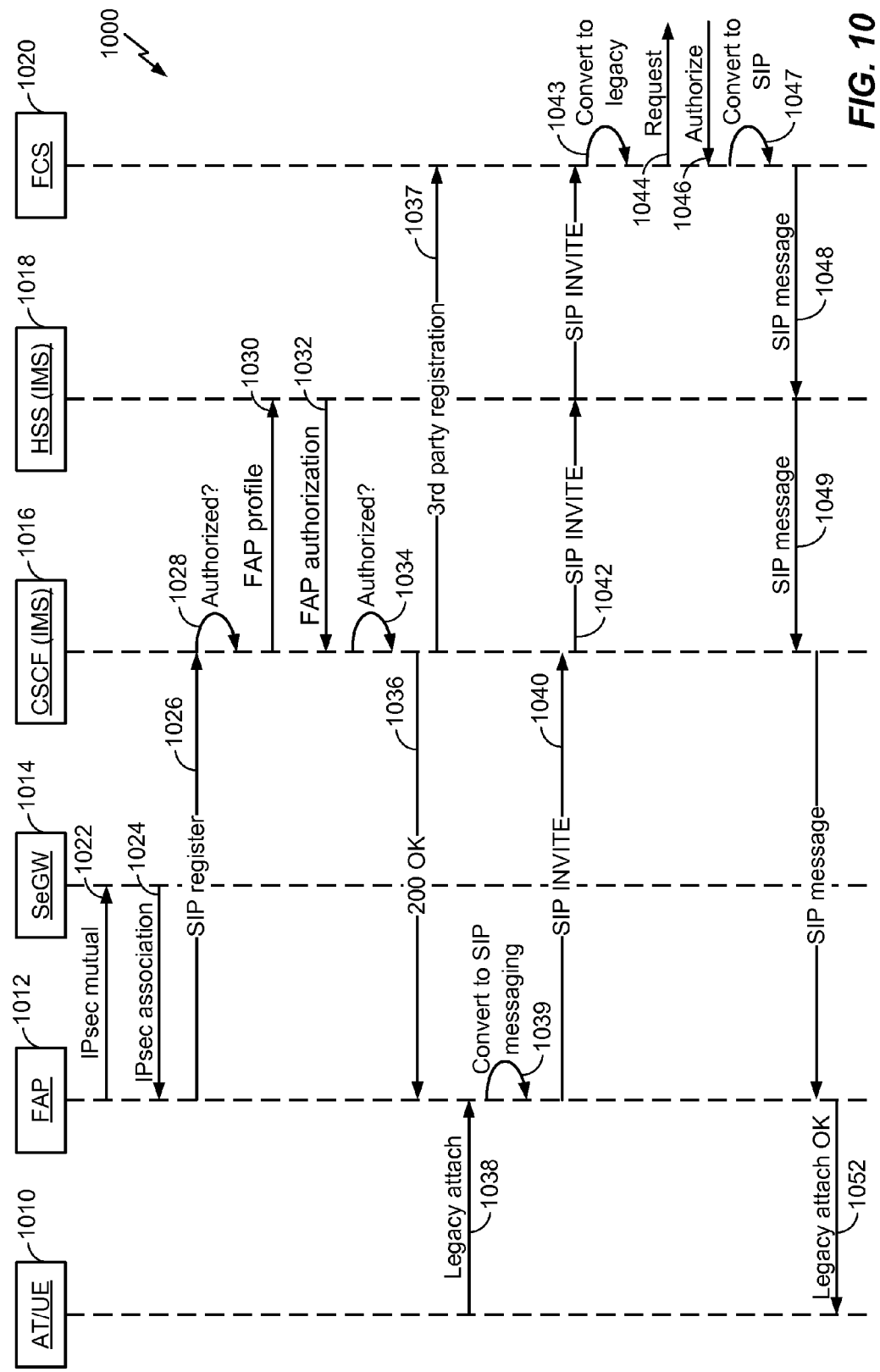
FIG. 10 is a protocol diagram depicting a messaging protocol to perform secure registration of femto access points using a convergence server within an IMS environment, in accordance with one embodiment of the invention.

FIG. 10 is a protocol diagram depicting a messaging protocol to perform secure registration of femto access points using a convergence server within an IMS environment, in accordance with one embodiment of the invention. As an option, the present protocol 1000 may be implemented in the context of the architecture and functionality of FIG. 1 through FIG. 9. Of course, however, the protocol 1000 or any operation therein may be carried out in any desired environment.

As shown, the protocol 1000 is carried out by components including an access terminal AT/UE 1010, a femto access point FAP 1012, a security gateway SeGW 1014, a CSCF (IMS) 1016, and an authorizing component in the form of an HSS 1018. Also participating in the protocol is a femtocell convergence server FCS 1020.

The protocol may commence at any point in time, and the specific order and/or interleaving of messages and operations involved in the protocol are presented for illustrative purposes.

As shown, FAP 1012 initiates a protocol exchange, possibly through a femto access point gateway (not shown) for establishing an IPsec security association from the SeGW 1014 (see message 1022). The SeGW may respond by returning the requested IPsec association (see message 1024). Using the obtained IPsec association, the FAP 1012 may send a SIP register message to a CSCF (see message 1026). The CSCF may in some cases confirm authorization (see operation 1028), but in other cases, the CSCF may request authorization from an authorizing component (e.g. HSS 1018). In such cases the CSCF sends a request (including the femto access point profile) to the authorizing component (see message 1030). Assuming the authorizing component can satisfy the authorization request, the authorizing component returns an authorization credential (see message 1032). The CSCF, having sufficient credentials to authorize at least some access to the network elements covered by the credential, then may perform additional authorization steps (see operation 1034), and sends a SIP OK message to the requestor (see message 1036). In some cases, the CSCF may perform additional registration steps; for example, the CSCF may initiate third party core network registration (see message 1037), and the third party core network registration may return credentials to the CSCF (not shown).

Given the existence of message 1036, the femto access point is a trusted node within the domain corresponding to the credential, and may be regarded by that domain as a trusted node. Accordingly, an access terminal (e.g. AT/UE 1010) may initiate an attach or registration request (see message 1038), which request is converted into a SIP message (see operation 1039) and forwarded to a CSCF, possibly as a SIP INVITE message (see message 1040) that is sent and/or relayed (see message 1042) to the FCS 1020. As earlier indicated, the FCS serves to bridge IMS domain services with non-IMS domain services (e.g. in the circuit switched domain), including converting SIP messages to legacy messages (see operation 1043). Accordingly, a SIP INVITE message received at an FCS might be converted into a request (see message 1044) and authorization response from the non-IMS domain (see message 1046), which authorization is converted back into a SIP message format (see operation 1047) and returned to the requestor, possibly by relay (see message 1048, see message 1049). As shown the relay results in a legacy attach or registration "OK" message being sent to the legacy AT 1010 (see message 1052).

Figure 11:
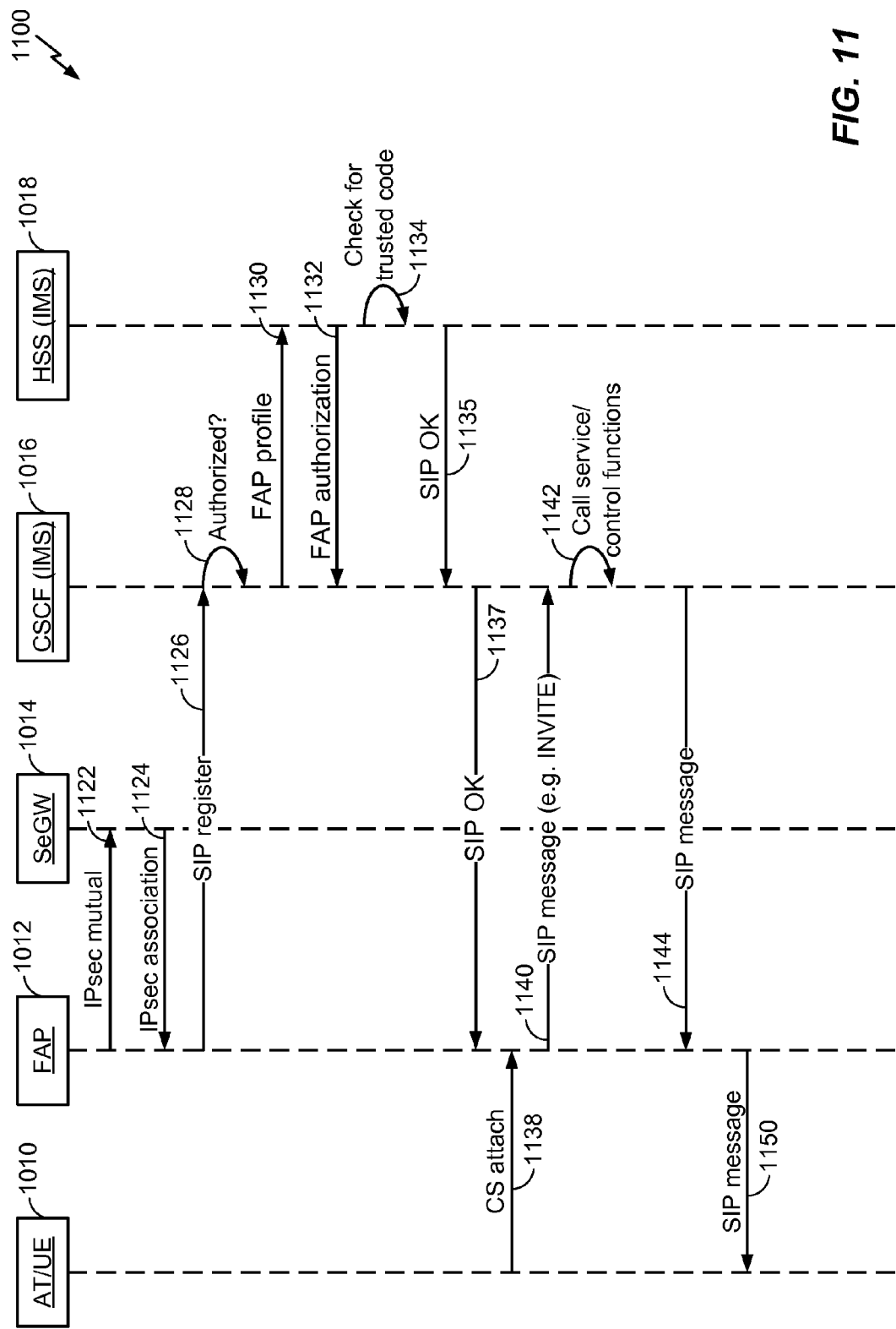
FIG. 11 is a protocol diagram depicting a messaging protocol to perform secure registration of femto access points within a full IMS environment, in accordance with one embodiment of the invention.

FIG. 11 is a protocol diagram depicting a messaging protocol to perform secure registration of femto access points within a full IMS environment, in accordance with one embodiment of the invention. As an option, the present protocol 1100 may be implemented in the context of the architecture and functionality of FIG. 1 through FIG. 10. Of course, however, the protocol 1100 or any operation therein may be carried out in any desired environment.

As shown, the protocol 1100 is carried out by components including an access terminal AT/UE 1010, a femto access point FAP 1012, security gateway SeGW 1014, a CSCF (IMS) 1016, and an authorizing component in the form of an HSS 1018. The protocol may commence at any point in time, and the specific order and/or interleaving of messages and operations involved in the protocol are presented for illustrative purposes. As shown, FAP 1012 initiates a protocol exchange for establishing an IPsec security association from the SeGW 1014 (see message 1122). The SeGW may respond by returning the requested IPsec association (see message 1124). Using the obtained IPsec association, the FAP 1012 may send a SIP register message to a CSCF (see message 1126). The CSCF may in some cases confirm authorization (see operation 1128), but in other cases, the CSCF may request authorization from an authorizing component HSS 1018. In such cases, the CSCF 1016 sends a request (including the femto access point profile) to the authorizing component HSS 1018 (see message 1130). Assuming the authorizing component can satisfy the authorization request, the authorizing component returns an authorization credential (see message 1132) to the CSCF 1016. The messaging protocol to perform secure registration of femto access points within a full IMS environment does not require interaction (e.g., for 3$^{rd}$ party registration) with an FCS 1020. The services may be delivered entirely within the IMS domain. In addition, the CSCF 1016, possibly in conjunction with the HSS, has the necessary database to check if the FAP is a trusted node. That is, the CSCF 1016 and HSS 1018 are members of a group of operator-controlled network elements 626 operating within an operator-controlled network 521. Accordingly, the CSCF 1016, possibly in conjunction with the HSS 1018 has access to authorization databases, including at least an IPsec address dataset 504, and may be able to respond with a SIP "OK" message (see message 1135), which is in turn relayed to the requesting FAP 1012 (see message 1137). In other situations, HSS 1018 may not have direct access to a needed authorization database, and may perform some operation (see operation 1134), possibly including additional messaging (not shown) to check for existence of an authorization credential. Given the existence of message 1137, the femto access point is a trusted node within the domain corresponding to the credential, and may be regarded by that domain as a trusted node. Accordingly, an access terminal (e.g. AT/UE 1010) may initiate an attach or registration request (see message 1138), which request is forwarded to a CSCF 1016, possibly as a SIP INVITE message (see message 1140) that is sent and/or relayed (see message 1142) to CSCF 1016, which may then provide or manage IMS domain services using IMS domain networking components (i.e., without the aid of FCS 1020 or without the aid of any non-IMS domain component). Accordingly, a SIP INVITE message received at CSCF 1016 might initiate a SIP protocol exchange for provision of IMS services, which provision of services might result in sending a SIP message (see message 1144) to FAP 1012, and further on to AT/UE 1010 (see message 1150).

Figure 12:
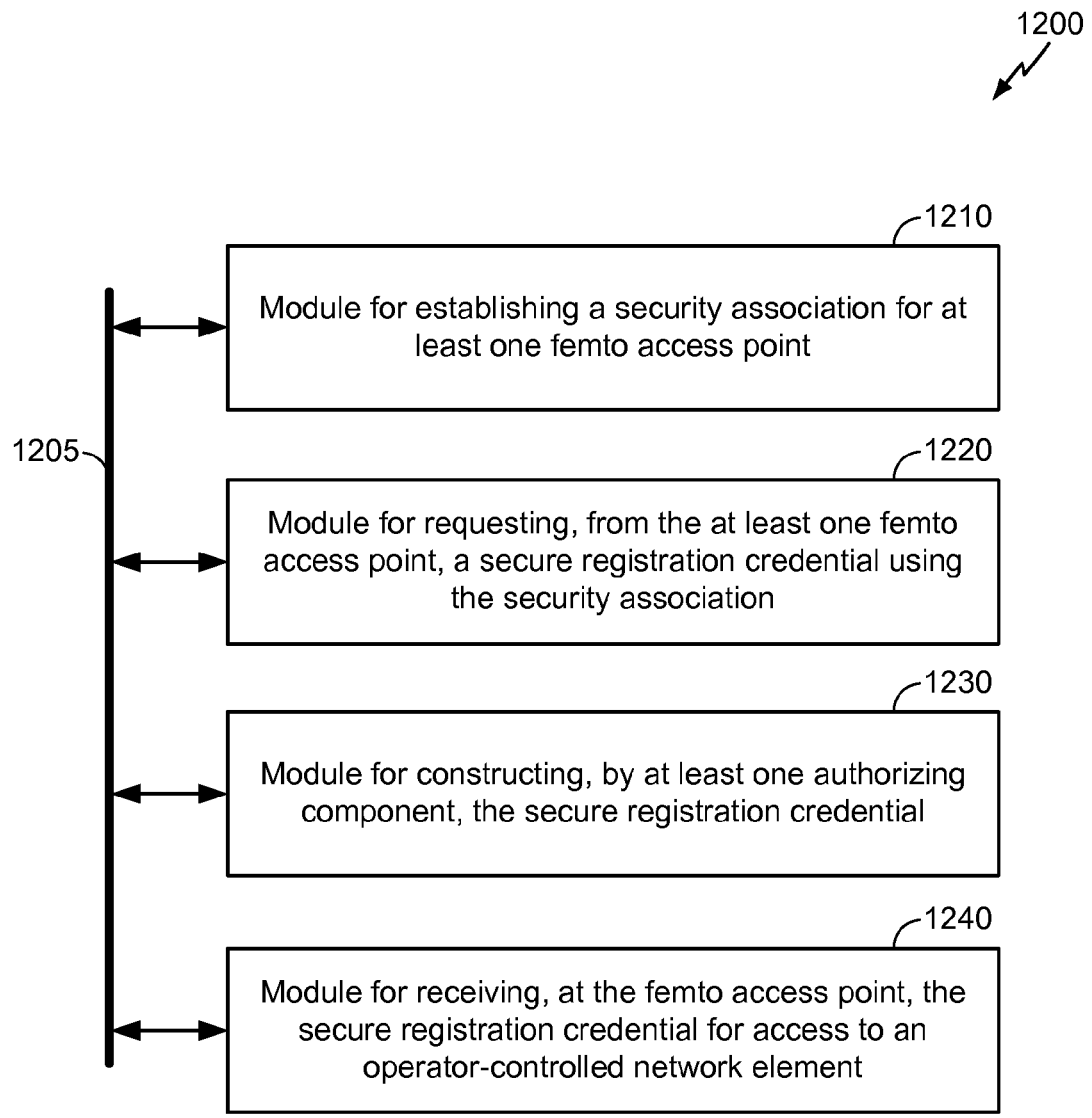
FIG. 12 depicts a block diagram of a system for secure registration of femto access points for access to an operator-controlled network element, in accordance with one embodiment of the invention.

FIG. 12 depicts a block diagram of a system to perform secure registration of femto access points for access to an operator-controlled network element. As an option, the present system 1200 may be implemented in the context of the architecture and functionality of the embodiments described herein. Of course, however, the system 1200 or any operation therein may be carried out in any desired environment. As shown, system 1200 includes a plurality of modules, each connected to a communication link 1205, and any module can communicate with other modules over communication link 1205. The modules of the system can, individually or in combination, perform method steps within system 1200. Any method steps performed within system 1200 may be performed in any order unless as may be specified in the claims. As shown, system 1200 implements a method for access to an operator-controlled network element, the system 1200 comprising modules for: establishing a security association for at least one the femto access point (see module 1210); requesting, from the at least one femto access point, a secure registration credential using the security association (see module 1220); constructing, by at least one authorizing component, the secure registration credential (see module 1230); and receiving, at the femto access point, the secure registration credential for access to an operator-controlled network element (see module 1240).

Figure 13:
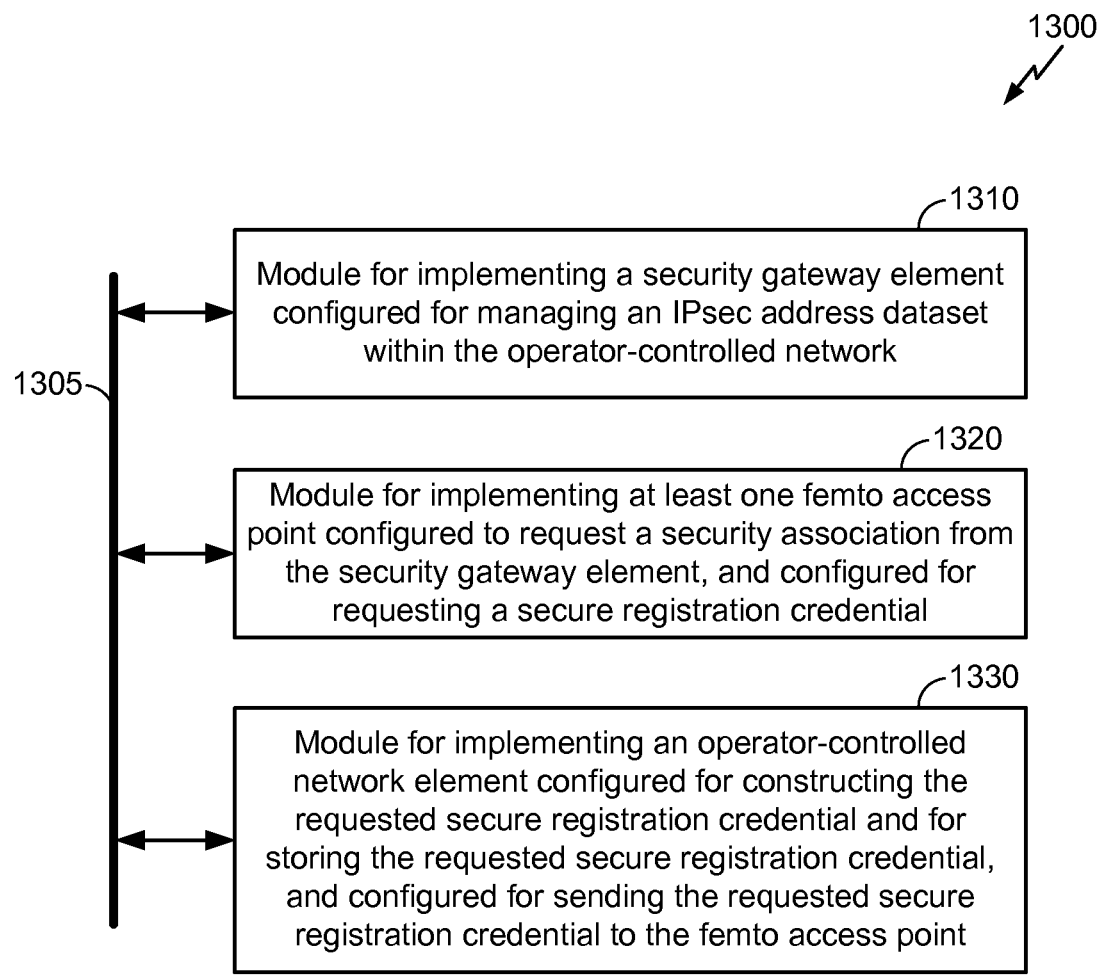
FIG. 13 depicts a block diagram of a system to perform certain functions of a communication system to perform secure registration of femto access points for access to an operator-controlled network element, in accordance with one embodiment of the invention.

FIG. 13 depicts a block diagram of a system to perform certain functions of a communication system to perform secure registration of femto access points. As an option, the present system 1300 may be implemented in the context of the architecture and functionality of the embodiments described herein. Of course, however, the system 1300 or any operation therein may be carried out in any desired environment. As shown, system 1300 comprises a plurality of modules including a processor and a memory, each module connected to a communication link 1305, and any module can communicate with other modules over communication link 1305. The modules of the system can, individually or in combination, perform method steps within system 1300. Any method steps performed within system 1300 may be performed in any order unless as may be specified in the claims. As shown, FIG. 13 implements a communication system to per as a system 1300, comprising modules including a security gateway element configured for managing an IPsec address dataset within the operator-controlled network (see module 1310); at least one the femto access point configured to request a security association from the security gateway element, and configured for requesting a secure registration credential (see module 1320); and, at least one the operator-controlled network element configured for constructing the requested secure registration credential and for storing the requested secure registration credential, and configured for sending the requested secure registration credential to the femto access point (see module 1330).

Figure 14:
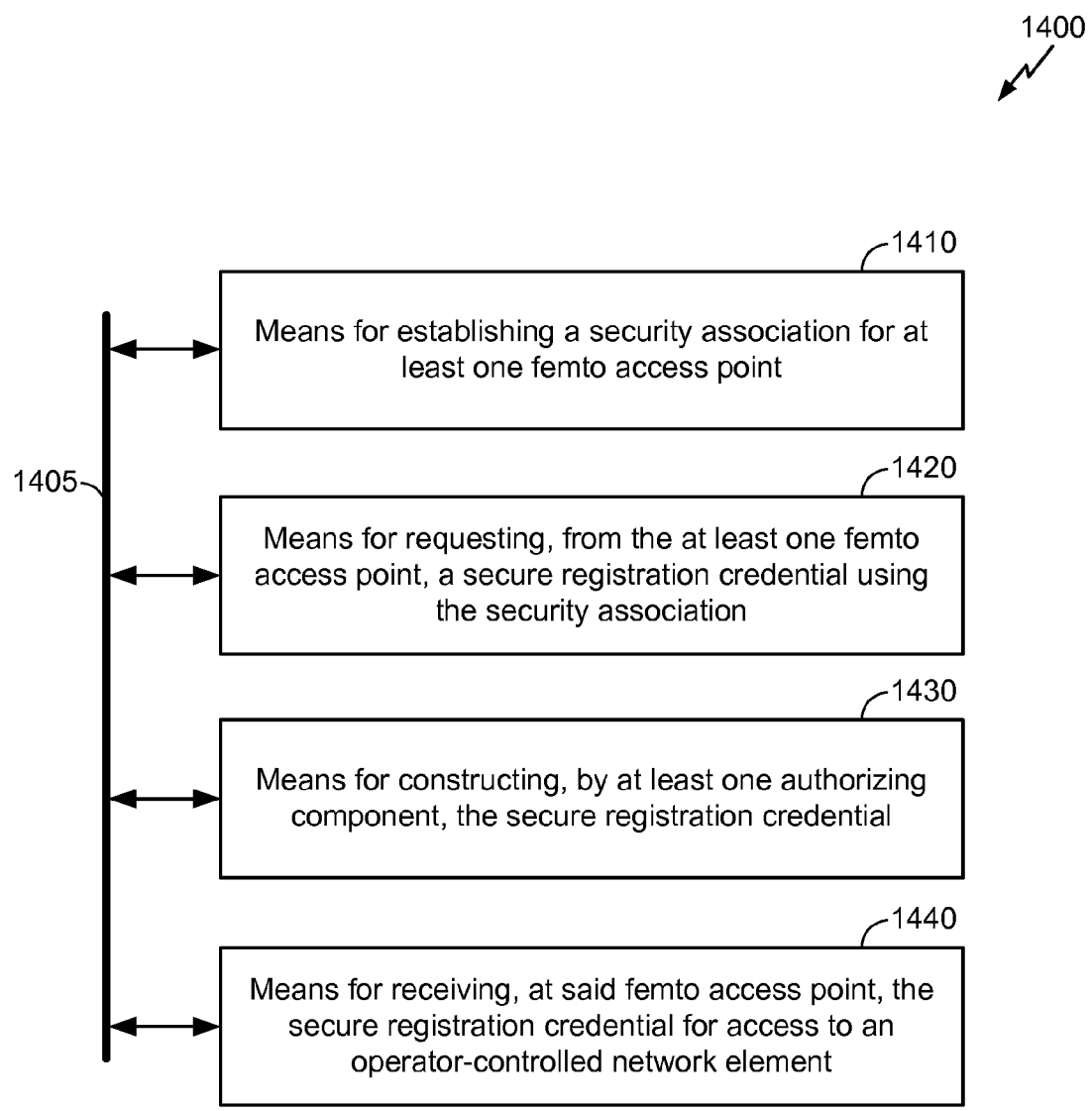
FIG. 14 depicts a block diagram of an apparatus perform secure registration of femto access points for access to an operator-controlled network element using hardware and software means, in accordance with one embodiment of the invention.

FIG. 14 depicts a block diagram of an apparatus perform secure registration of femto access points for access to an operator-controlled network element using hardware and software means. As an option, the present system 1400 may be implemented in the context of the architecture and functionality of the embodiments described herein. Of course, however, the system 1400 or any operation therein may be carried out in any desired environment. As shown, system 1400 includes a plurality of hardware and software components, each connected to a communication link 1405, and any one component can communicate with the others over communication link 1405. The system 1400 can, individually or in combination, perform method steps within system 1400. Any method steps performed within system 1400 may be performed by any component and in any order unless as may be specified in the claims. As shown, FIG. 14 implements an apparatus for access to an operator-controlled network element comprising components implementing: means for establishing a security association for at least one the femto access point (see component 1410); means for requesting, from the at least one femto access point, a secure registration credential using the security association (see component 1420); means for constructing, by at least one authorizing component, the secure registration credential (see component 1430); and means for receiving, at the femto access point, the secure registration credential for access to an operator-controlled network element (see component 1440).

Figure 15:
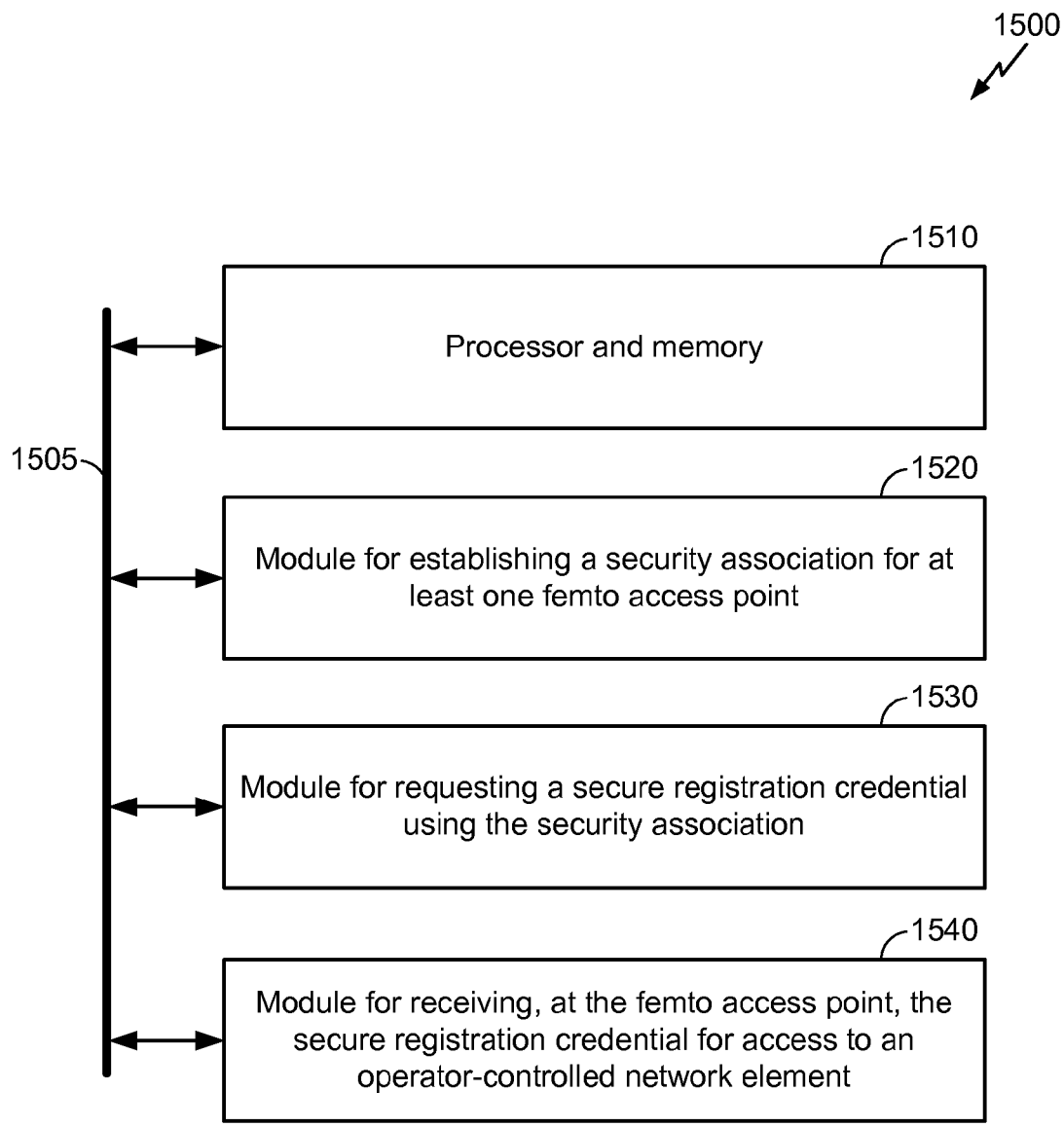
FIG. 15 depicts a block diagram of a system to perform certain functions of a femto access point, in accordance with one embodiment of the invention.

FIG. 15 depicts a block diagram of a system to perform certain functions of a femto access point. As an option, the present system 1500 may be implemented in the context of the architecture and functionality of the embodiments described herein. Of course, however, the system 1500 or any operation therein may be carried out in any desired environment. As shown, system 1500 comprises a plurality of modules including a processor and a memory, each module connected to a communication link 1505, and any module can communicate with other modules over communication link 1505. The modules of the system can, individually or in combination, perform method steps within system 1500. Any method steps performed within system 1500 may be performed in any order unless as may be specified in the claims. As shown, FIG. 15 implements a femto access point as a system 1500, comprising modules including at least one processor and memory (see module 1510) and modules for: establishing a security association for at least one the femto access point (see module 1520); requesting a secure registration credential using the security association (see module 1530); and receiving, at the femto access point, the secure registration credential for access to an operator-controlled network element (see module 1540).

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes", "has" or "having" are used in either the detailed description or the claims, such terms are intended to be inclusive in a manner similar to the term "comprising" as "comprising" is interpreted when employed as a transitional word in a claim.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium.

In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method to perform secure registration of a femto access point for access to at least one operator-controlled network element, comprising:
    establishing a security association for the femto access point;
    requesting, from the femto access point, a secure registration credential using the security association;
    constructing, by at least one authorizing component, the secure registration credential;
    receiving, at the femto access point, the secure registration credential for access to the at least one operator-controlled network element; and
    preventing the femto access point from forwarding IP packets from other network entities with a source IP address having a same address as an address defined by the femto access point.

2. The method as set forth in claim 1, wherein establishing a security association is established by an IPsec security association received from a security gateway (SeGW).

3. The method as set forth in claim 1, wherein establishing a security association is performed in conjunction with at least one operator-controlled network element performing the function of a security gateway (SeGW).

4. The method as set forth in claim 1, wherein establishing a security association is performed using at least one operator-controlled database of IPsec inner addresses.

5. The method as set forth in claim 1, wherein requesting registration, from the femto access point, includes requesting registration using a SIP message.

6. The method as set forth in claim 1, wherein authorizing the requested registration is performed in conjunction with a call session control function (CSCF) element.

7. The method as set forth in claim 6, wherein the at least one operator-controlled network element exchanges a femto access point profile with at least one home subscriber server (HSS).

8. The method as set forth in claim 6, wherein the at least one operator-controlled network element exchanges a femto access point profile with at least one authorizing component.

9. The method as set forth in claim 1, wherein authorizing the requested registration is performed in conjunction with at least one operator-controlled network element performing the functions of a CSCF element.

10. The method as set forth in claim 1, wherein said receiving a secure registration for access to the at least one operator-controlled network element includes receiving a SIP OK message.

11. The method as set forth in claim 1, further comprising: relaying an access request from an access terminal.

12. The method as set forth in claim 11, wherein the relayed access request is relayed using SIP message.

13. The method as set forth in claim 11, wherein the relayed access request includes an integrity-protected indication.

14. The method as set forth in claim 1, wherein the address defined by the femto access point comprises a source IP address of the femto access point.

15. A communication system to perform secure registration of a femto access point for access to at least one operator-controlled network element comprising:
    a security gateway element configured for managing an IPsec address dataset within the operator-controlled network;
    the femto access point configured for requesting a security association from the security gateway element, configured for requesting a secure registration credential using the security association, and configured for refraining from forwarding IP packets from other network entities with a source IP address having a same address as an address defined by the femto access point; and
    the at least one operator-controlled network element configured for constructing the requested secure registration credential and for storing the requested secure registration credential, and configured for sending the requested secure registration credential to the femto access point.

16. The communication system as set forth in claim 15, wherein the security gateway element is a second operator-controlled network element performing the function of a security gateway.

17. The communication system as set forth in claim 15, wherein the IPsec address dataset includes an operator-controlled database of IPsec inner addresses.

18. The communication system as set forth in claim 15, wherein the femto access point is configured for requesting a secure registration credential using a SIP message.

19. The communication system as set forth in claim 15, wherein sending the requested secure registration credential to the femto access point is performed in conjunction with a call session control function (CSCF) element.

20. The communication system as set forth in claim 15, wherein the at least one operator-controlled network element exchanges a femto access point profile with at least one home subscriber server (HSS).

21. The communication system as set forth in claim 15, wherein the at least one operator-controlled network element exchanges a femto access point profile with at least one authorizing component.

22. The communication system as set forth in claim 15, wherein requesting a secure registration credential is performed using a SIP message.

23. The communication system as set forth in claim 15, wherein the femto access point is further configured for relaying an access request from an access terminal.

24. The communication system as set forth in claim 15, wherein sending the requested secure registration credential to the femto access point includes sending a SIP OK message.

25. The communication system as set forth in claim 15, wherein the address defined by the femto access point comprises a source IP address of the femto access point.

26. A non-transitory computer readable media embodying a method to perform secure registration of a femto access point for access to at least one operator-controlled network element, the method comprising:
 establishing a security association for the femto access point;
 requesting, from the femto access point, a secure registration credential using the security association;
 constructing, by at least one authorizing component, the secure registration credential;
 receiving, at the femto access point, the secure registration credential for access to the at least one operator-controlled network element; and
 preventing the femto access point from forwarding IP packets from other network entities with a source IP address having a same address as an address defined by the femto access point.

27. The non-transitory computer readable media as set forth in claim 26, wherein establishing a security association is established by an IPsec security association received from a security gateway (SeGW).

28. The non-transitory computer readable media as set forth in claim 26, wherein establishing a security association is performed in conjunction with at least one operator-controlled network element performing the function of a security gateway (SeGW).

29. The non-transitory computer readable media as set forth in claim 26, wherein establishing a security association is performed using at least one operator-controlled database of IPsec inner addresses.

30. The non-transitory computer readable media as set forth in claim 26, wherein requesting registration, from the femto access point, includes requesting registration using a SIP message.

31. The non-transitory computer readable media as set forth in claim 26, wherein authorizing the requested registration is performed in conjunction with a call session control function (CSCF) element.

32. The non-transitory computer readable media as set forth in claim 26, wherein the at least one operator-controlled network element exchanges a femto access point profile with at least one home subscriber server (HSS).

33. The non-transitory computer readable media as set forth in claim 26, wherein authorizing the requested registration is performed in conjunction with at least one operator-controlled network element performing the functions of a CSCF element.

34. The non-transitory computer readable media as set forth in claim 26, wherein said receiving a secure registration for access to the at least one operator-controlled network element includes receiving a SIP OK message.

35. The non-transitory computer readable media of claim 26, further comprising:
 relaying an access request from an access terminal.

36. The non-transitory computer readable media as set forth in claim 26, wherein the address defined by the femto access point comprises a source IP address of the femto access point.

37. An apparatus for performing secure registration of a femto access point for access to at least one operator-controlled network element, comprising:
 means for establishing a security association for the femto access point;
 means for requesting, from the femto access point, a secure registration credential using the security association;
 means for constructing, by at least one authorizing component, the secure registration credential;
 means for receiving, at the femto access point, the secure registration credential for access to an operator-controlled network element; and
 means for preventing the femto access point from forwarding IP packets from other network entities with a source IP address having a same address as an address defined by the femto access point.

38. The apparatus as set forth in claim 37, wherein establishing a security association is established by an IPsec security association received from a security gateway (SeGW).

39. The apparatus as set forth in claim 37, wherein establishing a security association is performed in conjunction with at least one operator-controlled network element performing the function of a security gateway (SeGW).

40. The apparatus as set forth in claim 37, wherein establishing a security association is performed using at least one operator-controlled database of IPsec inner addresses.

41. The apparatus as set forth in claim 37, wherein requesting registration, from the femto access point, includes requesting registration using a SIP message.

42. The apparatus as set forth in claim 37, wherein authorizing the requested registration is performed in conjunction with a call session control function (CSCF) element.

43. The apparatus as set forth in claim 37, wherein the at least one operator-controlled network element exchanges a femto access point profile with at least one home subscriber server (HSS).

44. The apparatus as set forth in claim 37, wherein the at least one operator-controlled network element exchanges a femto access point profile with at least one authorizing component.

45. The apparatus as set forth in claim 37, wherein authorizing the requested registration is performed in conjunction with at least one operator-controlled network element performing the functions of a CSCF element.

46. The apparatus as set forth in claim 37, wherein said receiving a secure registration for access to the at least one operator-controlled network element includes receiving a SIP OK message.

47. The apparatus as set forth in claim 37, further comprising:
 means for relaying an access request from an access terminal.

48. A femto access point for secure access to at least one operator-controlled network element comprising:
   at least one processor and memory for:
   establishing a security association for the femto access point;
   requesting a secure registration credential using the security association;
   receiving, at the femto access point, the secure registration credential for access to the at least one operator-controlled network element; and
   preventing the femto access point from forwarding IP packets from other network entities with a source IP address having a same address as an address defined by the femto access point.

49. The femto access point as set forth in claim 48, wherein establishing a security association is established by an IPsec security association received from a security gateway (SeGW).

50. The femto access point as set forth in claim 48, wherein establishing a security association is performed in conjunction with at least one operator-controlled network element performing the function of a security gateway (SeGW).

51. The femto access point as set forth in claim 48, wherein establishing a security association is performed using at least one operator-controlled database of IPsec inner addresses.

52. The femto access point as set forth in claim 48, wherein requesting registration, from the femto access point, includes requesting registration using a SIP message.

53. The apparatus as set forth in claim 37, wherein the address defined by the femto access point comprises a source IP address of the femto access point.

54. A computer program product comprising:
   a non-transitory computer readable medium further comprising:
   code for causing at least one computer to establish a security association for a femto access point;
   code for causing the at least one computer to request, from the femto access point, a secure registration credential using the security association;
   code for causing the at least one computer to construct, by at least one authorizing component, the secure registration credential;
   code for causing the at least one computer to receive, at the femto access point, the secure registration credential for access to an operator-controlled network element; and
   code for causing the at least one computer to prevent the femto access point from forwarding IP packets from other network entities with a source IP address having a same address as an address defined by the femto access point.

55. The computer program product as set forth in claim 54, wherein the address defined by the femto access point comprises a source IP address of the femto access point.

* * * * *